US007522308B2

(12) United States Patent
Ueda

(10) Patent No.: US 7,522,308 B2
(45) Date of Patent: Apr. 21, 2009

(54) METHOD OF DETECTING COLOR DEVIATION IN COLOR IMAGE FORMING APPARATUS, CONTROL DEVICE, CONTROL PROGRAM, AND IMAGE FORMATION ARTICLE FOR DETECTING THE COLOR DEVIATION

(75) Inventor: Masashi Ueda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 618 days.

(21) Appl. No.: 11/036,346

(22) Filed: Jan. 18, 2005

(65) Prior Publication Data

US 2005/0219304 A1 Oct. 6, 2005

(30) Foreign Application Priority Data

Apr. 6, 2004 (JP) ............................ 2004-111835

(51) Int. Cl.
*H04N 1/60* (2006.01)
*G06F 3/12* (2006.01)

(52) U.S. Cl. .......................... 358/1.9; 358/1.1; 358/518

(58) Field of Classification Search .................. 358/1.9, 358/1.1, 2.1, 500, 518, 515, 516, 517, 519, 358/3.26, 3.27, 1.15, 1.13, 1.14, 1.18, 1.16, 358/1.17; 382/162, 163, 164, 165, 167, 293; 399/28, 39, 184, 298, 301, 394; 347/19, 347/24

See application file for complete search history.

(56) References Cited

U.S. PATENT DOCUMENTS 6,134,022 A 10/2000 Yamamoto et al.

FOREIGN PATENT DOCUMENTS

| | | |
|---|---|---|
| EP | 753959 A2 * | 1/1997 |
| JP | 9-30053 | 2/1997 |
| JP | 2000-035704 | 2/2000 |
| JP | 2000-059628 | 2/2000 |
| JP | 2001-007949 | 1/2001 |

* cited by examiner

*Primary Examiner*—Dov Popovici
(74) *Attorney, Agent, or Firm*—Oliff & Berridge, PLC

(57) ABSTRACT

A method of detecting color deviation in a color image forming apparatus by obtaining basic color information including at least one of (A) color information of at least one of a first-color basic image, a second-color basic image, and a superposed-color basic image which is formed by the color image forming apparatus, and (B) color information of the image-formation medium which is not colored by any of the two colors; obtaining superposed-pattern color information which is color information of a pattern-superposed image formed by the color image forming apparatus such that two pattern images each provided by each of the two colors are superposed; and detecting a relative positional deviation between the two pattern images, on the basis of the basic color information and the superposed-pattern color information.

17 Claims, 12 Drawing Sheets

METHOD OF DETECTING COLOR DEVIATION IN COLOR IMAGE FORMING APPARATUS, CONTROL DEVICE, CONTROL PROGRAM, AND IMAGE FORMATION ARTICLE FOR DETECTING THE COLOR DEVIATION

The present application is based on Japanese Patent Application No. 2004-111835 filed on Apr. 6, 2004, the contents of which are incorporated herein by reference.

BACKGROUND OF THE INVENTION

1. Field of the Invention

The present invention relates in general to a method of detecting color deviation in a color image forming apparatus such as a color printer and a color copying machine, and an image-formation article such as a test sheet, which is used in detecting the color deviation and which comprises color-deviation-detecting images formed thereon. The invention also relates to a control device which controls the color image forming apparatus such that the apparatus is capable of executing operations relating to the detection of the color deviation, and a control program for controlling the color image forming apparatus to execute the operations.

2. Discussion of Related Art

In general, a color image forming apparatus such as a color printer and a color copying machine forms a color image by superposing a plurality of monocolor images on one another. Described in detail, for instance, the color image forming apparatus is equipped with image forming units respectively for coloring materials having the respective plurality of colors. The image forming units are moved relative to a base object such as a printing sheet, for instance, which is an image-formation medium, and the coloring materials are attached to the surface of the base object at respective appropriate positions thereof, so that the color image is formed. A phenomenon that the positions of the monocolor images provided by the respective plurality of colors and formed by the respective image forming units deviate from one another, in other words, color deviation or out of color registration deteriorates the quality of the color image to be formed by the color image forming apparatus. It is important to properly or suitably detect the color deviation for maintaining or improving the quality of the color image. Further, it is possible to obtain a high-quality color image by inhibiting the color deviation. In view of the above, JP-A-2001-7949 discloses a method of detecting color deviation in the color image.

The detecting method disclosed in JP-A-2001-7949 is arranged to detect an amount of deviation of positions of two monocolor images based on a color of an image in which the two monocolor images respectively having predetermined patterns are superposed on each other. Since, in the disclosed method, the positional deviation amount is not directly measured, the disclosed method permits easy detection of the color deviation. However, there may occur a phenomenon that the monocolor images are not formed so as to have the respective predetermined patterns, due to aged deterioration of the color image forming apparatus, the environment in which the apparatus is disposed, etc. Further, there may occur a phenomenon that the colors of the superposed image change due to the influence of the color of the image-formation medium, the influence of the coloring materials to be attached or the amounts thereof to be attached, etc. Such phenomena are factors that deteriorate an accuracy of detection of the color deviation. Thus, in the light of an increasing demand for improvement in the quality of the color image, the disclosed method is not practical to a satisfactory extent.

SUMMARY OF THE INVENTION

It is therefore a first object of the present invention to provide a practically effective method of detecting color deviation in a color image forming apparatus. It is a second object of the invention to provide an image-formation article suitable for the method of detecting color deviation. It is a third object of the invention to provide a control device which controls a color image forming apparatus to execute operations relating to the detection of color deviation with high utility. It is a fourth object of the invention to provide a control program for controlling the color image forming apparatus to execute the operations.

The color image forming apparatus to which the present invention is applied is arranged to form a color image by superposing monocolor images each provided by each of plurality of colors. The method of detecting color deviation according to the present invention is characterized by detecting a relative positional deviation between two pattern images, based on not only color information of a pattern-superposed image that is a principal image for which the color deviation detection is carried out and that is formed by superposing the two pattern images each provided by each of two colors of the plurality of colors, but also color information of at least one basic image from which is obtained information that is a basis for detecting the color deviation. The present detecting method eliminates or mitigates the influence of the factors which deteriorate the accuracy of detection of the color deviation, owing to the color information of the basic image, so that the result of detection has a high degree of accuracy. The present image-formation article used for detecting the color deviation is characterized by comprising a base object which is an image-formation medium, and the pattern-superposed image and the basic image which are formed on the base object. As described above, since the image-formation article comprises the basic image formed on the base object, in addition to the pattern-superposed image, the color deviation can be detected with high accuracy by using the present image-formation article. Further, the control device and the control program according to the present invention are for controlling the color image forming apparatus to form not only the pattern-superposed image, but also the basic image. Since the basic image is formed in addition to the pattern-superposed image by using the present control device and the present control program, it is possible to detect the color deviation with high accuracy based on image information of the basic image. As explained above, the detecting method, etc., according to the present invention are means or measures for realizing accurate detection of the color deviation. By carrying out the means, the practicability of the detection of the color deviation is improved. The detecting method, etc., according to the present invention described above are basic forms of the invention. The present invention may be embodied in various other forms which will be described below in detail under the heading "FORMS OF THE INVENTION".

FORMS OF THE INVENTION

There will be described in detail various forms of the present invention, which are considered claimable. Each of the forms of the invention is numbered like the appended claims and depends from the other form or forms, where appropriate, for easier understanding of the technical features disclosed in the present specification. It is to be understood that the present invention is not limited to the technical features or any combinations thereof which will be described, and shall be construed in the light or the following descriptions of the various forms and a preferred embodiment of the invention. It is to be further understood that a plurality of elements or features included in any one of the following forms of the invention are not necessarily provided all together, and that the invention may be embodied with selected at least one of the elements or features described with respect to the same form.

The forms of the present invention are classified into a plurality of categories consisting of a detecting method, a control device, a control program, a recording medium, and an image-formation article. The explanation of the invention will be made in this order. Since the concept such as the elements, the concrete embodiment, etc., are common among the plurality of categories, portions of the explanation relating to the color deviation detecting method, which portions are considered to be applied also to other categories, are dispensed with in the explanations of other categories, in the interest of brevity.

(1) A method of detecting color deviation in a color image forming apparatus which forms a color image on an image-formation medium by superposing monocolor images each provided by each of plurality of colors, the method comprising:

obtaining basic color information including at least one of (A) color information of at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image which is formed by the color image forming apparatus and from which is obtained information that is a basis for detecting the color deviation, and (B) color information of the image-formation medium which is not colored by any of the two colors;

obtaining superposed-pattern color information which is color information of a pattern-superposed image formed by the color image forming apparatus such that two pattern images each provided by each of the two colors are superposed; and detecting a relative positional deviation between the two pattern images, on the basis of the basic color information and the superposed-pattern color information.

The form (1) described above and the following modes (2)-(10) belong to the category of the color deviation detecting method. The method of detecting color deviation according to the above-described form (1) is not arranged to directly detect a positional deviation between the two pattern images superposed on each other, but arranged to detect the positional deviation, based on the color of the pattern-superposed image in which the two pattern images are superposed on each other, more specifically, based on a difference from the color of the pattern-superposed image in a state in which the two pattern images are superposed on each other without any positional deviation, for instance. The detection of the positional deviation between the two pattern images permits detection of the color deviation in the color image forming apparatus. A method of detecting color deviation by directly detecting an amount of the deviation is considered as a microscopic detecting method, whereas the present detecting method is considered as a macroscopic detecting method. The present method assures simplified detection of the color deviation without requiring any high-technology, complicated measuring devices such as a scanning measuring device.

According to the detecting method of the above-described form (1), in detecting the positional deviation based on color information of the pattern-superposed image, the detection is performed on the basis of basic color information which is color information of the basic image, etc., in other words, the detection is performed by referring to the basic color information. The basic color information can be utilized as information for grasping the degree of influence of various factors which influence the detection accuracy, such as the condition of the color image forming apparatus. Where the detection of the positional deviation is carried out by referring to such information, the detecting method according to the form (1) assures high detecting accuracy. Therefore, the detecting method according to the form (1) enjoys practically effective color deviation detection as well as simplified detection described above.

The color image forming apparatus to which the present detecting method is applied is not particularly limited, but includes, for instance, various electronically controlled printing apparatus such as color printers of an ink-jet type and a laser type, color facsimile machines, color copying machines. Further, the present detecting method is also applicable to printing apparatus arranged to perform multiple-plate printing by letterpress printing, silk printing, or the like.

In the present detecting method, the basic color information and the superposed-pattern color information can be obtained by using various color measuring devices such as: a color measuring device constituted by including a colorimeter capable of measuring a color value according to various colorimetric systems, a spectral colorimeter, or the like; and a color measuring device constituted by including an image-data reading device such as a scanner or a CCD camera, and an image-data processing portion adapted for calculating color information based on the image data. Where the basic color information and the superposed-pattern color information are obtained by using the measuring devices described above, the detection of the positional deviation can be carried out by using a device constituted principally by a computer, for instance. If the detection is carried out using the various measuring devices and the device constituted principally by the computer, the positional deviation can be detected with high accuracy. The detecting method according to the form (1) is not limited to the method using those devices. For instance, at least one of the basic color information and the superposed-pattern color information may be obtained by visual observation. Further, the detection may be carried out based on judgment by the human sense. The obtaining the basic color information and the obtaining the superposed-pattern color information should be carried out before the detecting a relative positional deviation. The obtaining the basic color information and the obtaining the superposed-pattern color information may be carried out at substantially the same time, or any one of the former and the latter may precedes or follows the other of the former and the latter.

In the detecting method according to the form (1), the image-formation article used for obtaining the color information may be single or plural. For instance, there may be used a single image-formation article which includes both of the pattern-superposed image and the basic image which are formed thereon. Alternatively, there may be used plural image-formation articles having image-formation media whose image-formation surfaces are the same in quality, and the pattern-superposed image and the basic image are formed on different ones of the plural image-formation articles.

"Relative positional deviation between the two pattern images" to be detected by the detecting method according to the form (1) should not be interpreted as a narrow concept simply meaning "positional deviation amount", but as a broad concept including presence or absence of positional deviation, direction of positional deviation, relationship between a positional deviation amount and a certain reference value, and so on. While the detecting method according to the form (1) is arranged to detect the positional deviation between the two monocolor images, the detecting method may be arranged to detect relative positional deviation for all of the plurality of images, by repeating the three steps described in the form (1), i.e., the obtaining basic color information, the obtaining superposed-pattern color information, and the detecting a relative positional deviation, so at to detect positional deviation between at least one of the two images and the rest of the plurality of images other than the two images.

"Pattern-superposed image" in the form (1) is a source from which is obtained principal color information for detecting the positional deviation. The pattern-superposed image is not particularly limited in structure, as long as its color changes depending upon the positional deviation between the two pattern images which cooperate to provide the pattern-superposed image and as long as the change in color of the pattern-superposed image is detectable. In other words, "two pattern images" may have respective patterns which cause the change in color of the pattern-superposed image due to the relative positional deviation between the two pattern images. There may be employed various patterns such as a pattern including a plurality of lines arranged in parallel in one direction (which will be explained), a pattern in which a plurality of lines are arranged in lattice, a pattern in which a plurality of dots are scattered, and a pattern including a plurality of annular lines whose centers are common to one another.

"Basic image" in the form (1) is an auxiliary image in relation with the pattern-superposed image and is information from which is obtained color information that is referred to in detecting the positional deviation. In this respect, "basic image" may be referred to as "reference image", and "basic color information" may be referred to as "reference color information". Described more specifically, the basic image is utilized for obtaining color information from which is grasped the degree of influence of various factors that affect the detection accuracy (hereinafter referred to as "detection-accuracy inhibition factors") such as the condition of the color image forming apparatus as described above. "First-color basic image", "second-color basic image" and "pattern-superposed image" are referred to as "basic image".

Each of "first-color basic image" and "second-color basic image" is a monocolor image and can be utilized for obtaining color information from which is grasped the influence of the detection-accuracy inhibition factors relating to the color of a monocolor which provides the color image. In detail, the color of a portion in the formed image, which portion is colored with the monocolor and which may be hereinafter referred to as "monocolor portion", may change due to a change in an amount per unit area (e.g., thickness) of the attached coloring material (hereinafter referred to simply as "the amount"), for instance, with changes in various conditions such as: aged deterioration of the color image forming apparatus; operating conditions of the image forming units; the kind of the coloring materials; conditions of the image forming apparatus such as environment (e.g., temperature) in which the apparatus is disposed; and image forming conditions. (These various conditions are hereinafter referred to simply as "apparatus conditions"). The change in the color of the monocolor portion becomes the detection-accuracy inhibition factors, deteriorating the detection accuracy. The first-color basic image and the second-color basic image can be used for the purpose of eliminating or mitigating the influence of such factors. In this instance, each of the first-color basic image and the second-color basic image may be formed, for instance, as a basic image having a pattern in which a predetermined area is entirely, uniformly colored by the monocolor, in other words, a solidly colored pattern (which is hereinafter referred to as "solidly-colored pattern").

"Superposed-color basic image" is a basic image in which mutually different two monocolors are superposed and can be utilized for obtaining color information from which is grasped the degree of influence of the detection-accuracy inhibition factors relating to the color of a superposed color which provides the color image. (The superposed color may be referred to as "mixed color".) When the color of the monocolor portion in the formed image changes due to the changes in the apparatus conditions as described above, the color of a portion in the formed image, which portion is colored with the superposed color and which may be hereinafter referred to as "superposed-color portion, changes. The change in the superposed-color portion may be larger than that of the monocolor portion, due to effects of composition of the changes in the colors of the two monocolors and superposition of the two monocolors. The superposed-color basic image can be utilized for eliminating or mitigating the influence of such factors. In this instance, the superposed-color basic image may be formed, for instance, as a solidly-colored pattern, like the first-color basic image and the second-color basic image.

The above-described "first-color basic image" and "second-color basic image" can be utilized for obtaining color information from which is grasped the degree of influence of the detection-accuracy inhibition factors relating to the patterns of the two pattern images constituting the formed pattern-superposed image. Described in detail, if the apparatus conditions change, for example, the amount of the coloring material to be attached changes, so that a rate of area of the colored portion in each pattern (hereinafter referred to as "colored-area rate") changes. More specifically described, if the amount of the coloring material increases, there occurs a phenomenon that the edge of the colored portion invades the non-colored portion, i.e., a so-called "bleeding" phenomenon. Due to this phenomenon, the colored-area rate changes. Such changes in the patterns become the detection-accuracy inhibition factors, thereby changing the relationship between the color of the pattern-superposed image and the relative positional deviation between the two pattern images, resulting in deterioration in the detection accuracy. Where the actual colored-area rate of each pattern image is different from the predetermined colored-area rate, there may occur a phenomenon that the color information of the pattern-superposed image does not change when the relative positional deviation between the two pattern images is small, even if the two pattern images actually suffer from the relative positional deviation. Namely, when the colored-area rate changes, there may exist a deviation-amount-undetectable range which also deteriorates the detection accuracy. It is effective to grasp a size of that range for realizing highly reliable color deviation detection. The first-color basic image and the second-color basic image can be utilized for eliminating the influence of such factors. In this instance, each of the first-color basic image and the second-color basic image is formed, for instance, as a pattern basic image whose pattern is the same as the patterns of the pattern images which constitute the pattern-superposed image.

In the above-described form (1), the basic color information also includes color information of an image-formation medium (strictly, the image-formation surface of the medium) which is not colored with any of the plurality of colors. Like the color information of the basic image described above, the color information of the image-formation medium can also be utilized for obtaining color information from which is grasped the influence of the detection-accuracy inhibition factors. For instance, if the color of the image-formation medium changes, color of a non-colored portion in the pattern-superposed image changes. As a result, the color of the pattern-superposed image changes. Namely, if the positional deviation is detected based on the color information of the image-formation medium, the detection accuracy is improved. It is noted that a portion in the image-formation medium which is not colored by any of the plurality of colors may be considered as a basic image without any colored portions, namely, a non-colored basic image which is one kind of the basic image.

In the above-described form (1), as the color information to be obtained as the basic color information, it is not necessarily required to obtain all of the color information which include: the color information of all kinds of the basic image including the first-color basic image, the second-color basic image, and the superposed-color basic image; and the color information of the image-formation medium. Depending upon the intention, etc., or the characters of forming of each monocolor image and the superposed-color image, at least one color information may be obtained. It is preferable to obtain all color information for realizing highly accurate detection. The number of each of all kinds of the basic image is not limited to one. At least one kind of the basic image may be provided in plural numbers, so that plural color information may be obtained from the basic image in plural numbers. In other words, the image-formation article used in detection may comprise one basic image for each kind or plural basic images for each kind depending upon the intention. Further, the image-formation article may comprise all kinds of the basic image or at least one kind of the basic image depending upon the intention. In an extreme case, it is possible to use an image-formation article which does not comprise any basic images described above where only the color information of the image-formation medium is obtained as the basic color information.

In the above-described form (1), "color information" includes hue, value, chroma, and the like, and is interpreted as a broad concept including not only numerically expressed information, but also a difference in colors distinguishable by human visual sense, etc. "Color value" which will be explained is one of the numerically expressed color information. It is preferable to employ the color value as the color information particularly for highly accurate detection of the positional deviation. Where the color value is used as the color information, it is possible to employ, for instance, at least one of various parameters of various calorimetric systems such as Munsell colorimetric system, L*a*b* colorimetric system, L*C*h* colorimetric system, Hunter Lab colorimetric system, and XYZ (Yxy) colorimetric system; color difference; and tristimulus values (X, Y, Z). It is noted that "color information" is broadly interpreted so as to also include secondary information that can be obtained from the color value. For instance, a colored-area-rate index value indicative of the rate of area of the colored portion in the pattern basic image is included in the color information. The colored-area-rate index value will be explained in greater detail.

In the above-described form (1), the direction of the positional deviation to be detected is not particularly limited, provided that the positional deviation is detected in at least one direction. In general, the color image forming apparatus is arranged to form a two-dimensional image. In this instance, it is preferable to detect the positional deviation in two directions intersecting each other. Where a pattern-superposed image is constituted by two pattern images each having a pattern arranged to detect the positional deviation in one direction, two-dimensional positional deviation can be easily detected by also obtaining color information of another pattern-superposed image constituted by the two pattern images having patterns whose orientation is changed to detect the positional deviation in a direction different from the above-indicated one direction, and carrying out the detection based on the obtained color information.

(2) The method according to the above form (1), wherein the obtaining superposed-pattern color information comprises obtaining, as the superposed-pattern color information, a color value of the pattern-superposed image, and the detecting a relative positional deviation comprises detecting, on the basis of the color value of the pattern-superposed image, a relative positional deviation amount which is an amount of the relative positional deviation between the two pattern images, according to (C) relationship between (c-1) the color value of the pattern-superposed image and (c-2) color values of four constituent parts each of which partially constitutes the pattern-superposed image, the four constituent parts consisting of a first-color part provided by only one of the two colors, a second-color part provided by only the other of the two colors, a superposed-color part provided by superposing the two colors, and a medium-color part in which any of the two colors are not present and which has a color of the image-formation medium, and a constituent-part-area-ratio index value indicative of an area ratio of the four constituent parts, and (D) relationship between (d-1) the constituent-part-area-ratio index value and (d-2) the relative positional deviation amount.

The above-described form (2) is a form in which the technique of detecting the positional deviation is concretely limited. Where an image is formed such that two monocolor images are superposed on each other, the superposed image may have the above-described four constituent parts. Since the four constituent parts have the respective peculiar colors, the color of the superposed image as a whole (which may be referred to as "average color") differs if the area ratio of the four constituent parts differs. More specifically described, a color value C of the superposed image is generally expressed as follows, for instance:

$$C=\Sigma\alpha_n\cdot C_n\cdot S_n$$

wherein $C_n$ is a color value of each constituent part and $S_n$ is a rate of an area of each constituent part with respect to the entire area of the superposed image. In the above expression, $\alpha_n$ is a coefficient. Depending upon conditions, $\alpha_n$ may be a constant or a variable (function). The relationship (hereinafter may be referred to as "area ratio/color relationship") represented by the above expression as one example corresponds to the above-indicated relationship (C). In the pattern-superposed image in which two pattern images are superposed on each other, the area ratio of the four constituent parts changes when a positional deviation occurs between the two pattern images. By properly adjusting the patterns of the two pattern images, there is established relationship in which the area ratio is determined depending upon the positional deviation. (Hereinafter, this relationship may be referred to as "deviation-amount/area-ratio relationship".) This relationship corresponds to the above-indicated relationship (D). In the form (2), the detecting a relative positional deviation is arranged to detect the relative positional deviation amount between the two pattern images on the basis of the two relationship, and the relative positional deviation amount can be easily obtained from the color value of the pattern-superposed image.

In the form (2), since the detection is performed based on the color value which is numerically expressed color information, it is preferable to obtain the basic color information and the superposed-pattern color information using the measuring device described above. There may be employed various color values described above. In view of a fact that the above-described area-ratio/color relationship has linear property or linearity, it is preferable to employ the tristimulus values. Since the relative positional deviation amount is calculated on the basis of the obtained color value, it is preferable to utilize a computer, or the like. If the computer is utilized, the above-indicated relationships (C) and (D) may be stored in the computer in the form of expressions, functions, etc., and the relative positional deviation amount may be calculated by arithmetic operations, based on the color value of the pattern-superposed image. At least one of the above-indicated two relationship (C) and (D) may be stored in the computer in the form of a data map, and the relative positional deviation amount may be obtained by referring to the data map.

"Constituent-part-area-ratio index value" in the form (2) means various parameters each of which directly or indirectly indicates the area ratio of the four constituent parts. For instance, there may be employed various parameters such as: area ratios of the four constituent parts which are obtained on the basis of any one of the four constituent parts as reference; occupation rates of the respective constituent parts where the total is 100%; and a ratio of the dimension of each constituent part in one direction where the constituent parts are regularly arranged in that direction.

(3) The method according to the above form (2), wherein the obtaining basic color information comprises obtaining, as the basic color information, at least one of (E) a color value of at least one basic image an entirety of which is colored and which is formed as at least one of the first-color basic image, the second-color basic image, and the superposed-color basic image, and (F) a color value of the image-formation medium, and the detecting a relative positional deviation comprises: determining at least one of the color values of the four constituent parts on the basis of the at least one of (E) the color value of the at least one basic image and (F) the color value of the image-formation medium; and detecting the relative positional deviation amount on the basis of the determined at least one of the color values.

The above-described form (3) includes a form in which the color value of the constituent part of the pattern-superposed image is determined on the basis of the color value of the basic image having the solidly-colored pattern explained above, for obtaining, as the basic color information, color information from which is grasped the influence of the detection-accuracy-inhibition factors relating to the color of at least one of the two monocolors, the superposed color, and the image-formation medium, and the positional deviation amount is detected based on the determined color value. In detecting the positional deviation, there is employed, as at least one of the color values of the four constituent parts, the color value of the color which provides the actual pattern-superposed image, instead of a theoretically determined color value, thereby permitting accurate detection of the color deviation. For more accurate detection of the color deviation, it is desirable to obtain the color values of the basic images provided by the two monocolors and the basic image provided by the superposed color, and the color value of the image-formation medium, in order to determine the color values of all of the four constituent parts. The state in which an entirety of an image is colored is preferably a state in which the entirety of the image is uniformly colored by each of the two monocolors or the superposed color.

(4) The method according to the above form (2), wherein the obtaining basic color information comprises obtaining, as the basic color information, at least one colored-area-rate index value each indicative of an area rate of at least one colored portion of a pattern basic image which is formed as one of the first-color basic image and the second-color basic image and which is one of two images whose patterns are respectively the same as patterns of the respective two pattern images, and the detecting a relative positional deviation comprises: determining the constituent-part-area-ratio index value on the basis of the at least one colored-area-rate index value; and detecting the positional deviation amount on the basis of the determined constituent-part-area-ratio index value.

In the above-described form (4), for obtaining, as the basic color information, the above-described color information from which is grasped the influence of the detection-accuracy-inhibition factors relating to the patterns of the two pattern images constituting the formed pattern-superposed image, there is obtained a colored-area rate of at least one of two pattern basic images whose patterns are respectively the same as actual patterns of the respective two pattern images, the area ratio of the four constituent parts is determined based on the obtained colored-area rate, and the positional deviation amount is detected based on the determined area ratio. In detecting the positional deviation, there is employed, as a colored-area rate of at least one of the two pattern images constituting the pattern-superposed image, the colored-area rate of the at least one of the two pattern basic images whose patterns are respectively the same as the actual patterns, instead of a theoretically determined colored-area rate. Accordingly, the color deviation can be accurately detected. For more accurate detection of the color deviation, it is desirable to obtain the colored-area rates of both of the two pattern basic images.

"Colored-area-rate index value" in the form (4) means various parameters each of which directly or indirectly indicates the colored-area rate. For instance, there may be employed various parameters such as: an area rate of a colored portion where the whole image is 100%; an area ratio of a colored portion and a non-colored portion; and a ratio of the dimension of a colored portion and a non-colored portion in one direction where the colored portion and the non-colored portion are regularly arranged in that direction.

(5) The method according to the above form (1), wherein the two pattern images have respective patterns which are identical to each other.

The above-indicated form (5) relates to a limitation of the pattern of the pattern image. Where the two pattern images have respective patterns which are identical to each other as described in the form (5), it is possible to obtain the pattern-superposed image in which the above-described deviation-amount/area-ratio relationship is suitable.

(6) The method according to the above form (1), wherein the two pattern images have respective patterns each of which is constituted by a plurality of lines arranged so as to be spaced apart from one another, the plurality of lines extending in parallel with one another in a direction intersecting a detecting direction in which the relative positional deviation is detected.

The above-indicated form (6) relates to a limitation of the pattern of the pattern image. Where the two pattern images having the respective patterns described in the form (6) are utilized, it is possible to obtain the pattern-superposed image in which the deviation-amount/area-ratio relationship is suitable in one direction of the pattern-superposed image, permitting easy detection of the deviation amount in that direction.

(7) The method according to the above form (6), wherein the plurality of lines have the same width dimension and are arranged at a predetermined pitch with a predetermined spacing distance equal to the width dimension.

According to the above-indicated form (7), it is possible to obtain a pattern-superposed image having a deviation-amount/area-ratio relationship with high linear property, so as to assure improved accuracy in detecting the deviation amount using the pattern-superposed image. In the above form (7), each line has a constant width dimension. (8) The method according to the above form (1), wherein the two pattern images have respective patterns each of which is constituted such that color information of a region in the pattern-superposed image having a predetermined dimension and configuration is constant at any locations in the pattern-superposed image.

The above-indicated form (8) makes it easy to obtain the superposed-pattern color information. Described more specifically, in obtaining the color information using the measuring device, where a measuring region of the color measuring device is made equal to the above-indicated region having the predetermined dimension and configuration, this arrangement assures a high degree of freedom in a relative positional relationship between the image-formation article and the color measuring device, namely, in determination of the position of the measuring region within the image-formation article, thereby assuring relatively rough positioning of the image-formation article with respect to the color measuring device.

(9) The method according to the above form (1), further comprising forming at least one of the first-color basic image, the second-color basic image, and the superposed-color basic image on a base object which is the image-formation medium, using the color image forming apparatus.

The above-indicated form (9) is a form in which the forming the at least one basic image is included in the method of detecting a color deviation.

(10) The method according to the above form (1), further comprising forming the pattern-superposed image on a base object which is the image-formation medium, using the color image forming apparatus.

The above-indicated form (10) is a form in which the forming the pattern-superposed image is included in the method of detecting a color deviation.

(11) A control device which controls a color image forming apparatus which forms a color image on an image-formation medium by superposing monocolor images each provided by each of plurality of colors, the control device comprising:

a basic-image-forming control portion which controls the color image forming apparatus to form at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image from which is obtained information that is a basis for detecting color deviation in the color image forming apparatus; and a pattern-superposed-image-forming control portion which controls the color image forming apparatus to form a pattern-superposed image in which two pattern images each provided by each of the two colors are superposed.

The form (11) described above and the following forms (12)-(16) belong to the category of the control device which controls the color image forming apparatus. In the above form (11), the basic image and the pattern-superposed image can be formed by the color image forming apparatus, resulting in improved practicability of the apparatus. The control device according to the form (11) may be provided as a device principally constituted by a computer, for instance. The control device according to the form (11) may be independent of the color image forming apparatus which is controlled by the control device, or may constitute a part of the apparatus.

(12) The control device according to the above form (11), further comprising a relative-positional-relationship-changing control portion which changes a relative positional relationship between forming positions of two monocolor images each of which is provided by each of the two colors and which are formed by the color image forming apparatus, on the basis of information of a relative positional deviation between the two pattern images, which information is input to the relative-positional-relationship-changing control portion.

According to the above form (12), the color image forming apparatus can be adjusted based on the information of the relative positional deviation, so that the color image to be formed by the apparatus has a high quality. An arrangement in which the relative positional relationship is changed is not particularly limited, but any suitable arrangement may be employed depending upon the color image forming apparatus. For instance, in a color image forming apparatus arranged to form a color image by moving the image forming units which form the respective monocolor images, relative to the base object as an image-formation medium and by attaching the coloring materials to the base object at determined positions thereof, the forming position of each monocolor image can be changed by changing offset values in an apparatus coordinate of an image-formation coordinate for each monocolor image, for instance. Where the color image forming apparatus has a function of adjusting the forming position of each monocolor image, the relative-positional-relationship-changing control portion according to the form (12) is arranged to have a function of providing the color image forming apparatus with instructions to change the forming position.

The relative-positional-relationship-changing control portion according to the form (12) may be arranged such that information of the relative positional deviation as a detection result obtained by a positional-deviation detecting portion which will be described is automatically input to the relative-positional-relationship-changing control portion, so as to change the relative positional relationship. Further, the relative-positional-relationship-changing control portion may be arranged such that information of the relative positional deviation obtained by another detecting device, etc., which is independent of the present control device, may be input to the relative-positional-relationship-changing control portion by communication, for instance, so as to change the relative positional relationship based on the input information. Moreover, information of the relative positional deviation may be input by an operator through an operating panel, and the relative-positional-relationship-changing control portion may change the relative positional relationship based on the input information. It is noted that the term "automatically" should be interpreted as a concept including a case in which the operation by the operator as a trigger is carried out. In the specification, the term "automatically" is used in that meaning unless otherwise specified.

(13) The control device according to the above form (11), which controls the color image forming apparatus equipped with a color measuring device and which further comprises:

a basic-color-information-obtaining control portion which controls the color measuring device to obtain basic color information which includes at least one of (G) color information of at least one of the first-color basic image, the second-color basic image, and the superposed-color basic image, and (H) color information of the image-formation medium which is not colored by any of the two colors;

a superposed-pattern-color-information-obtaining control portion which controls the color measuring device to obtain superposed-pattern color information which is color information of the pattern-superposed image; and a positional-deviation detecting portion which detects a relative positional deviation between the two pattern images, on the basis of the basic color information and the superposed-pattern-color information which are obtained by the color measuring device.

The above-indicated form (13) is a form in which the color image forming apparatus is equipped with a color measuring device and the present control device also controls the color measuring device. As explained above, the color measuring device may be constituted principally by various calorimeters, or may be constituted by including the image-data reading device and the image-data processing portion. A part of the color measuring device may constitute a portion of the present control device. The positional-deviation detecting portion of the form (13) may be arranged so as to incorporate any of the technical features according to the above-described forms (2)-(4), relating to concrete process of detection of the positional deviation carried out by the positional-deviation detecting portion.

(14) The control device according to the above form (11), further comprising a pattern-changing control portion which changes at least one of patterns of the respective two pattern images which are formed by the color image forming apparatus.

In the above-described form (14), the pattern of the pattern image can be changed depending upon various situations. Accordingly, it is possible, for instance, to detect the color deviation in a state in which the influence of the detection-accuracy-inhibition factors due to a change in actually formed pattern, etc., is eliminated or alleviated. The pattern-changing control portion according to the form (14) may be arranged to arbitrarily change the pattern based on an arbitrary operation of the operator, or to automatically change the pattern in accordance with the measured result obtained by the above-described color measuring device as explained in the following form (15). Where the color image forming apparatus stores data relating to the patterns, the pattern-changing control portion of the form (14) may be arranged to control the apparatus to change the data. For assuring a higher degree of detection accuracy, it is desirable that the pattern-changing control portion is arranged to change both of the patterns of the two pattern images which are superposed on each other to provide the pattern-superposed image.

(15) The control device according to the abode form (14), wherein the basic-image-forming control portion comprises a portion which controls the color image forming apparatus to form at least one pattern basic image each of which is formed as at least one of the first-color basic image and the second-color basic image and which is at least one of two images whose patterns are respectively the same as the patterns of the respective two pattern images, the control device controls the color image forming apparatus equipped with a color measuring device and further comprises a pattern-basic-image-color-information-obtaining control portion which controls the color measuring device to obtain color information of the at least one pattern basic image, and the pattern-changing control portion comprises a portion which changes the at least one of the patterns of the respective two pattern images, on the basis of the color information of the at least one pattern basic image which is input to that portion.

In the above-described form (15), a pattern can be changed based on color information obtained by the color measuring device which is installed on the color image forming apparatus. According to this mode (15), the pattern image having a suitable pattern can be formed, resulting in improved practicability or serviceability of the color image forming apparatus. The pattern-changing control portion may be arranged to change the pattern based on color information of the pattern image input by the operator, or automatically change the pattern based on color information transmitted from the color measuring device. It is noted that the color information of the pattern image is one kind of the above-described basic color information and that the pattern-basic-image-color-information-obtaining control portion may be provided as a part of the basic-color-information-obtaining control portion.

The technical feature according to the form (15) that the pattern of the pattern image is changed based on the color information of the pattern basic image may be incorporated into the forms described above with respect to the color deviation detecting method. Namely, the color deviation detecting method according to any of the forms (1)-(10) may include the changing the pattern of the pattern image based on the color information of the pattern basic image.

(16) The control device according to the above form (11), which controls the color image forming apparatus equipped with a color measuring device including: an image-data reading device which reads image data; and an image-data processing portion which performs operation for obtaining color information on the basis of the image data read by the image-data reading device.

The control device of the above-indicated form (16) is arranged, for instance, to control a color image forming apparatus equipped with an image-data reading device such as a scanner, and is suitably applicable to a so-called multiple-function machine. The control device according to the form (16) may be arranged, for instance, such that the control device comprises an image-data-reading control portion for controlling the image-data reading device to read the image data and such that the above-described basic-color-information-obtaining control portion, superposed-pattern-color-information-obtaining control portion, and pattern-basic-image-color-information-obtaining control portion control, via the image-data-reading control portion, the image-data reading device to obtain the color information of the basic image and the pattern-superposed image, and control the image-data processing portion to obtain the color information of the basic image and the pattern-superposed image. It is noted that the image-data processing portion may constitute a part of the present control device.

(17) A control program executed by a computer for controlling a color image forming apparatus which forms a color image on an image-formation medium by superposing monocolor images each provided by each of plurality of colors, the control program comprising:

a basic-image forming step in which the color image forming apparatus forms at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image from which is obtained information that is a basis for detecting color deviation in the color image forming apparatus; and a pattern-superposed-image forming step in which the color image forming apparatus forms a pattern-superposed image in which two pattern images each provided by each of the two colors are superposed.

The form (17) described above belongs to the category of the control program. By using the control program according to the form (17), the basic image and the pattern-superposed image explained above can be formed by the color image forming apparatus, resulting in improved practicability of the apparatus. The form (17) may incorporate any of the technical features of the above-described forms relating to the control device. Briefly speaking, the control program of the form (17) may also be embodied by replacing " . . . portion" and " . . . control portion" in the above-described forms (12)-(15) and in the explanation of the forms (12)-(15), with " . . . step".

(18) A recording medium in which the control program according to the above form (17) is readably recorded.

The above-described form (18) belongs to the category of the recording medium. Like the above-described control program, the program recorded in the recording medium may incorporate any of the technical features of the above-described forms relating to the control device.

(19) An image-formation article used for detecting color deviation in a color image forming apparatus which forms a color image on an image-formation medium by superposing monocolor images each provided by each of plurality of colors, the image-formation article comprising:

a base object which is the image-formation medium;

at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic images being a basic image from which is obtained information that is a basis for detecting the color deviation, each of the basic images formed on the base object by the color image forming apparatus; and a pattern-superposed image in which two pattern images each provided by each of the two colors are superposed, the pattern-superposed image formed on the base object by the color image forming apparatus.

The above-described form (19) belongs to the category of the image-formation article formed by the color image forming apparatus. By using the image-formation article according to the form (19), the color deviation in the color image forming apparatus can be detected with high accuracy. Any of the above-described technical features according to the forms (5)-(8) may be incorporated into this form (19), relating to the pattern images which constitute the pattern-superposed image.

BRIEF DESCRIPTION OF THE DRAWINGS

The above and other objects, features, advantages and technical and industrial significance of the present invention will be better understood by reading the following detailed description of a preferred embodiment of the invention, when considered in connection with the accompanying drawings, in which.

DETAILED DESCRIPTION OF THE PREFERRED EMBODIMENT

There will be described one embodiment of the present invention by reference to the accompanying drawings. It is to be understood that the present invention is not limited to the following embodiment, and may be otherwise embodied with various changes and alternations, such as those described in the foregoing FORMS OF THE INVENTION, which may occur to those skilled in the art.

<1. Outline of Hardware Structure of Color Image Forming Apparatus>

Figure 1:
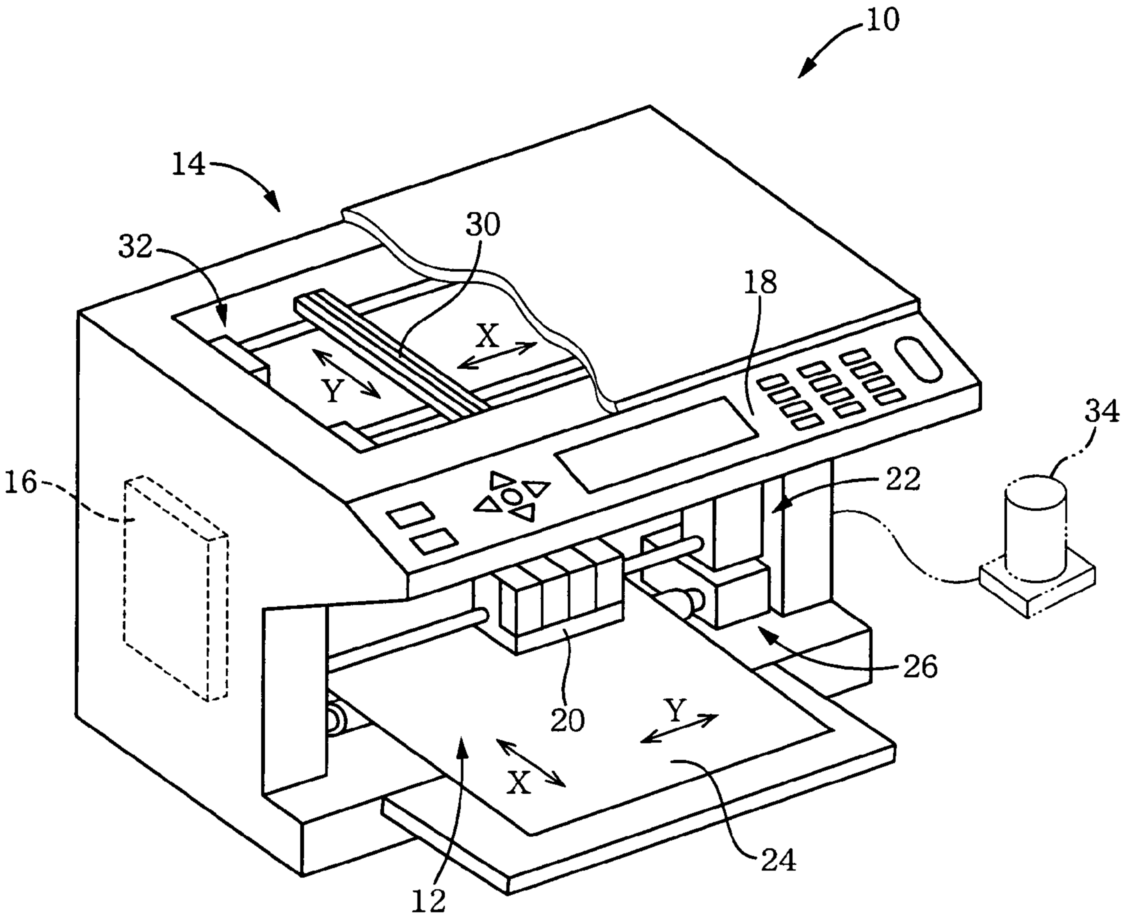
FIG. 1 is a schematic view showing a printer (color image forming apparatus) for which the color deviation detection according to the present invention carried out.

Referring first to the schematic view of FIG. 1, there is shown a printer 10 as a color image forming apparatus to which color deviation detection according to the present invention is applied. The printer 10 is a multiple-function machine equipped with an image scanner. From the viewpoint of a hardware structure, the printer 10 is constituted by including a printing device 12, a scanning device 14, a control device 16 for controlling the printing device 12 and the scanning device 14, and an operating panel 18.

The printing device 12 is of a general ink-jet type. The printing device 12 uses four inks each as a coloring material, namely, black ink (b) and three color inks, i.e., cyan (c), magenta (m), and yellow (y). Hereinafter, these four inks, i.e., black, cyan, magenta, and yellow may be referred to as "b". "c", "m", and "y", respectively. The four inks are accommodated in respective ink containers. The ink containers are installed on a printing head 20. Hereinafter, the printing head 20 may be simply referred to as "head 20". The head 20 includes four image forming units having nozzles and adapted for ejecting the respective inks. The head 20 is carried by a head carrier 22. The head 20 is moved by the head carrier 22 in a transverse direction as seen in FIG. 1, namely, in "Y"-direction indicated in FIG. 1. A printing sheet 24 (hereinafter may be referred to as "sheet 24") is fed from the back side of the printer 10 by a sheet feeder 26 in a sheet feeding direction, namely, in "X"-direction indicated in FIG. 1. The sheet 24 is a base object which is an image-formation medium. The sheet 24 is intermittently fed by the sheet feeder 26 in the X-direction while the head 20 is reciprocably moved by the head carrier 22 in the Y-direction, so that an image is printed on the entire surface of the sheet 24.

The scanning device 14 is of a general flat-bed type, and includes a scanning head 30 functioning as a reading device, which is moved by a scanning head carrier 32 in "X"-direction. In the scanning head 30, CCD elements as light-receiving elements and LED elements which function as a light source are arranged on one straight line in "Y"-direction. The scanning head 30 is moved by the scanning head carrier 32 in one direction, to thereby scan an image formed on a surface of a reading object which is placed on the flat bed.

The control device 16 is constituted principally by a computer including a CPU, a RAM, a ROM, an image-data processing unit, an input/output interface, bus lines connecting those components, etc. The control device 16 controls the printing device 12 and functions as a control device which controls the color image forming apparatus.

As will be explained in greater detail, in the present printer 10, the scanning device 14 is utilized as a device for obtaining color information relating to detection of the color deviation. The printer 10 may be arranged such that a calorimeter 34 is connectable to the printer 10 as an option, so as to obtain the color information utilizing the calorimeter 34.

<2. Outline of Formation of Color Image and Color Deviation>

Figure 2:
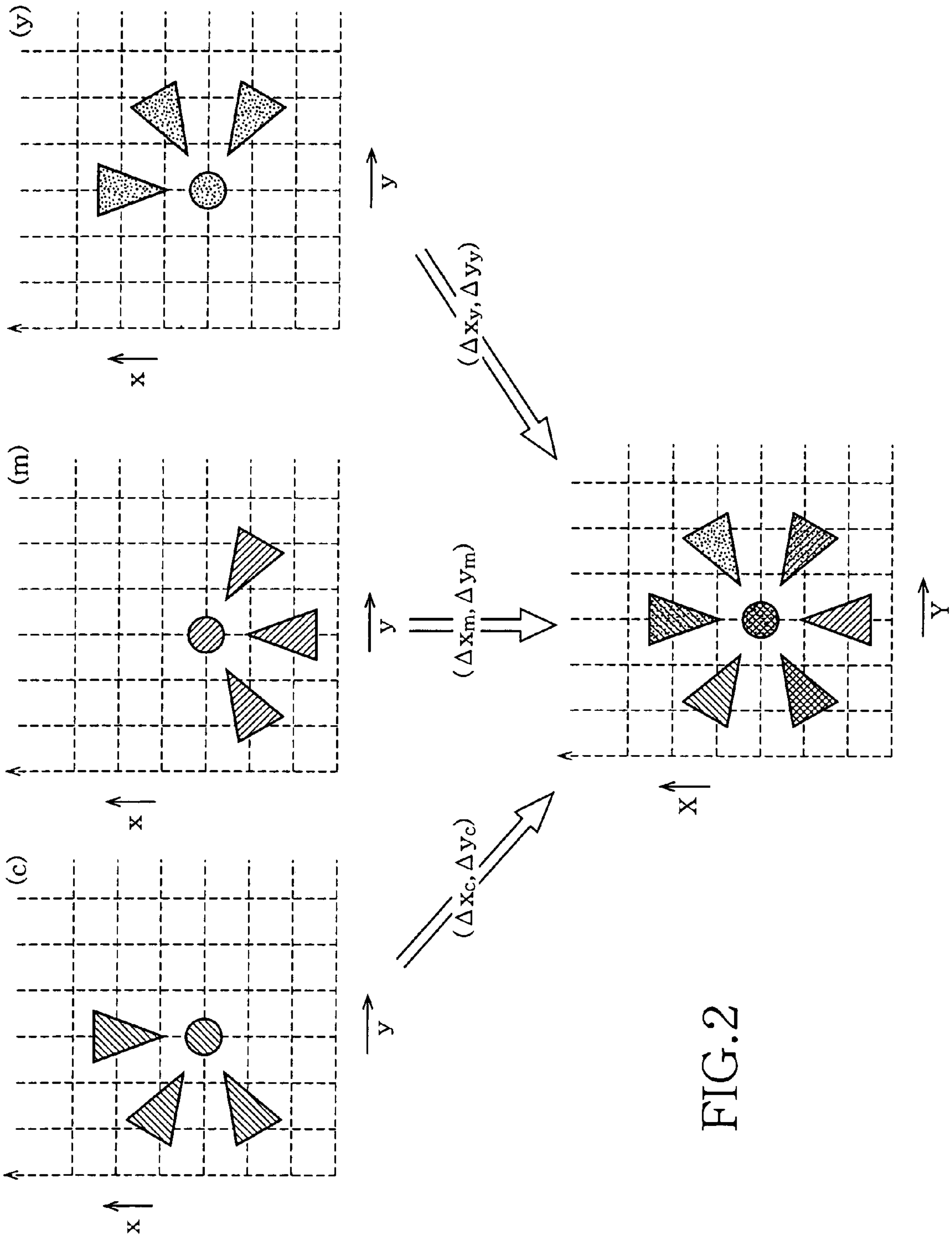
FIG. 2 is a view showing a technique for forming a color image by a printing device of the apparatus of FIG. 1.

The printing device 12 of the printer 10 performs printing operation under control of an external computer. As shown in FIG. 2, the printing of a color image is carried out by superposing monocolor images provided by the respective three color inks, i.e., cyan (c), magenta (m), and yellow (y). A manner of printing the color image will be very briefly explained. Each of image data of the three momocolor images fed from the external computer is collective data of ink-attaching dots (hereinafter may be referred to as "ink-attaching-dot data") on a virtual coordinate (x, y). The printing head 20 is arranged to form the monocolor images at respective predetermined positions on an apparatus coordinate (X, Y) by ejecting the respective inks. The ink-attaching-dot data on the virtual coordinate (x, y) of the image data of each monocolor image are converted by the control device 16 into ink-attaching-dot data on the apparatus coordinate (X, Y). When the head 20 is located at a position on the apparatus coordinate (X, Y) corresponding to the converted ink-attaching-dot data, the ink is ejected. Thus, each monocolor image is printed based on the converted ink-attaching-dot data. The monocolor images respectively provided by the three color inks are simultaneously printed by the relative movement of the head 20 and the sheet 24, and the color image is printed by one printing operation. The conversion of the ink-attaching-dot data on each virtual coordinate into the ink-attaching-dot data on the apparatus coordinate is performed by adding predetermined offset values ($\Delta x$, $\Delta y$) to the coordinate values on the virtual coordinate (x, y). The nozzles formed in the head 20 and provided for each of the three colors are located at respective different positions in the head 20. Therefore, the offset values ($\Delta x$, $\Delta y$) are present for each color. The offset values for the cyan, the magenta, and the yellow are respectively represented as ($\Delta x_c$, $\Delta y_c$, ($\Delta X_m$, $\Delta y_m$), and ($\Delta x_y$, $\Delta y_y$).

Since the color image is printed as described above, the color image suffers from color deviation when positional deviation occurs among the monocolor images provided by the respective three colors due to some reasons, e.g., positional deviation of the nozzles relative to the head 20. When the positional deviation occurs among the monocolor images, it is possible to eliminate or alleviate the positional deviation by changing the offset values ($\Delta x$, $\Delta y$) of at least one of the three colors. As will be explained in greater detail, the present printer 10 has functions of forming a test sheet which is utilized to detect the positional deviation among the momocolor images provided by the respective three colors; detecting an amount of the positional deviation using the test sheet; and eliminating or alleviating the positional deviation.

<3. Functional Structure of the Control Device for Controlling the Color Image Forming Apparatus>

Figure 3:
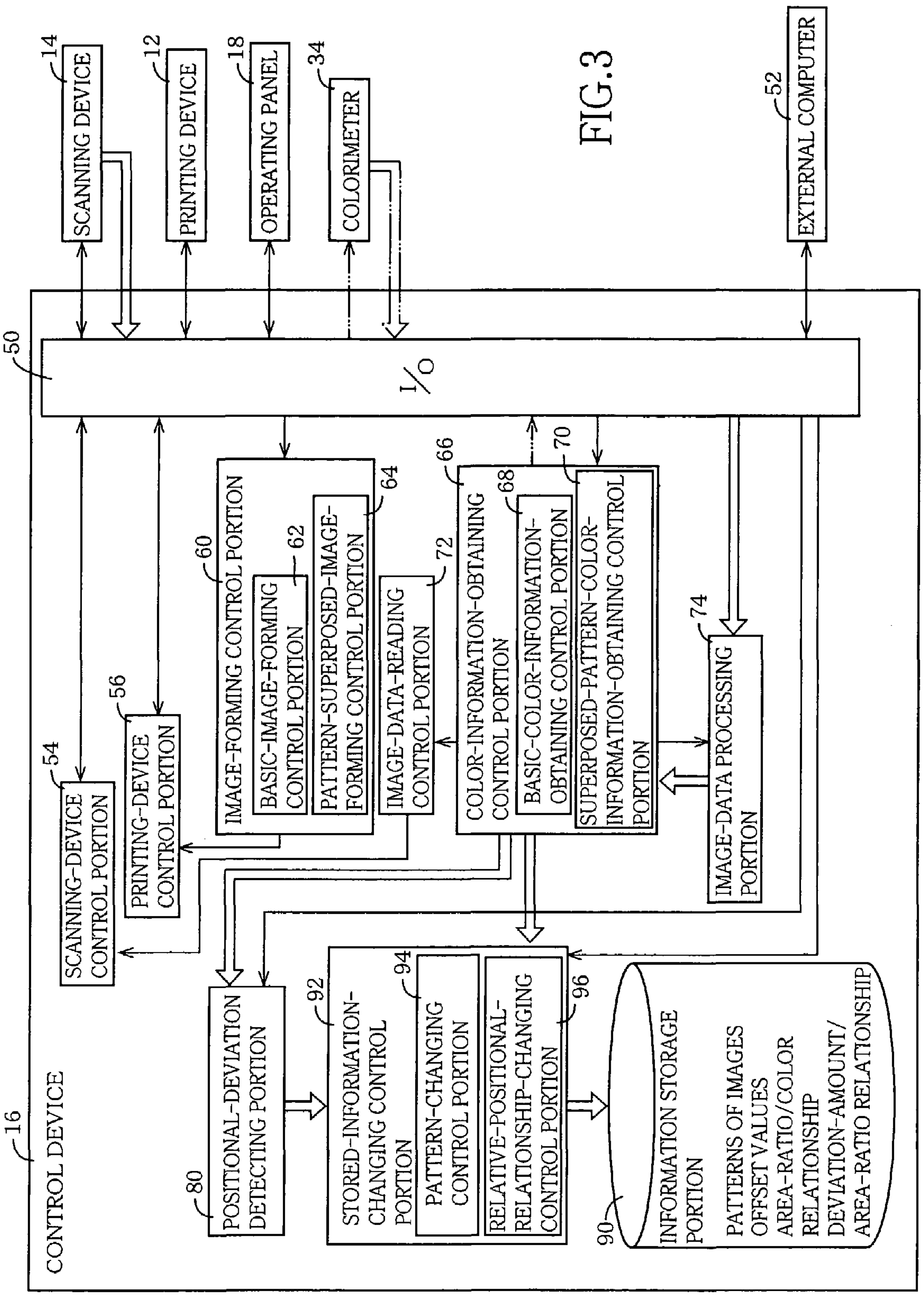
FIG. 3 is a block diagram schematically showing functions of a control device of the apparatus of FIG. 1.

The control device 16 as the control device for controlling the color image forming apparatus has a functional structure schematically shown in the block diagram of FIG. 3. This block diagram mainly shows portions which are greatly related to the present invention. In the block diagram, each of double-line arrows indicates mainly a flow of color-deviation-detection-relating information including color information while each of single-line arrows indicates mainly a flow of instructions and command information. Functions of functional portions shown in the block diagram will be explained in other section in greater detail, and a brief explanation of which is given in this section.

The control device 16 includes the input/output interface (I/O) 50. The scanning device 14, printing device 12, operating panel 18, calorimeter 34 as an option, and external computer 52 are connected to ports of the I/O 50. The control device 16 includes a scanning-device control portion 54 and a printing-device control portion 56 which controls operation of the scanning device 14 and operation of the printing device 12, respectively. The present printer 10 is arranged to perform ordinary printing operation and image-data reading operation based on commands of the external computer 52 and information input from the external computer 52. The scanning-device control portion 54 and the printing-device control portion 56 are arranged to respectively control the scanning device 14 and the printing device 12, in relation to such ordinary operation.

The control device 16 includes, as a control portion which performs operation of detecting the color deviation and operation relating to the detection of the color deviation (hereinafter, both operation may be referred to as "color-deviation-detection-relating operation"), an image-forming control portion 60 which performs operation for printing, on the sheet 24, images used for detecting the positional deviation. The image-forming control portion 60 includes a basic-image-forming control portion 62 and a pattern-superposed-image-forming control portion 64 as control portions which perform operation for printing basic images and operation for printing pattern-superposed images, respectively. The basic images and the pattern-superposed images are color-deviation-detecting images which will be described in greater detail. (Hereinafter, the color-deviation-detecting images may be referred to simply as "detecting images".)

The control device 16 includes a color-information-obtaining control portion 60 as a portion which performs operation for obtaining, from a test sheet which is an image-formation article on which the color-deviation-detecting images are printed, color information used for detecting the color deviation. The color-information-obtaining control portion 60 includes a basic-color-information-obtaining control portion 68 and a superposed-pattern-color-information-obtaining control portion 70 which perform operation for obtaining color information of the basic image and operation for obtaining color information of the pattern-superposed image, respectively. Where color information is obtained using the scanning device 14, a command is supplied to the scanning-device control portion 54 via an image-data-reading control portion 72, and image data read by the scanning device 14 are converted into color information by an image-data processing portion 74.

The control device 16 includes a positional-deviation detecting portion 80 as a portion which performs operation of detecting positional deviation among images provided by the respective colors, based on the obtained color information. The control device 16 further includes an information storage portion 90 which stores various information used in a color-deviation-detection-relating operation. The information storage portion 90 is constituted principally by a rewritable, non-volatile memory. The information storage portion 90 stores pattern data of the color-deviation-detecting images, arithmetic expression data indicative of area-ratio/color relationship and deviation-amount/area-ratio relationship, the aforementioned offset values, etc., which will be explained below in greater detail. The control device 16 further includes a stored-information-changing control portion 92 as a portion which performs operation for changing various information stored in the information storage portion 90, based on the detection result by the positional-deviation detecting portion 80. The stored-information-changing control portion 92 includes a pattern-changing control portion 94 which performs operation for changing pattern data of pattern images (which will be described) as one kind of the color-deviation-detecting image, and a relative-positional-relationship-changing control portion 96 which performs operation for changing the offset values.

<4. Image-Formation Article on which Color-Deviation-Detecting Images are Formed>

Figure 4:
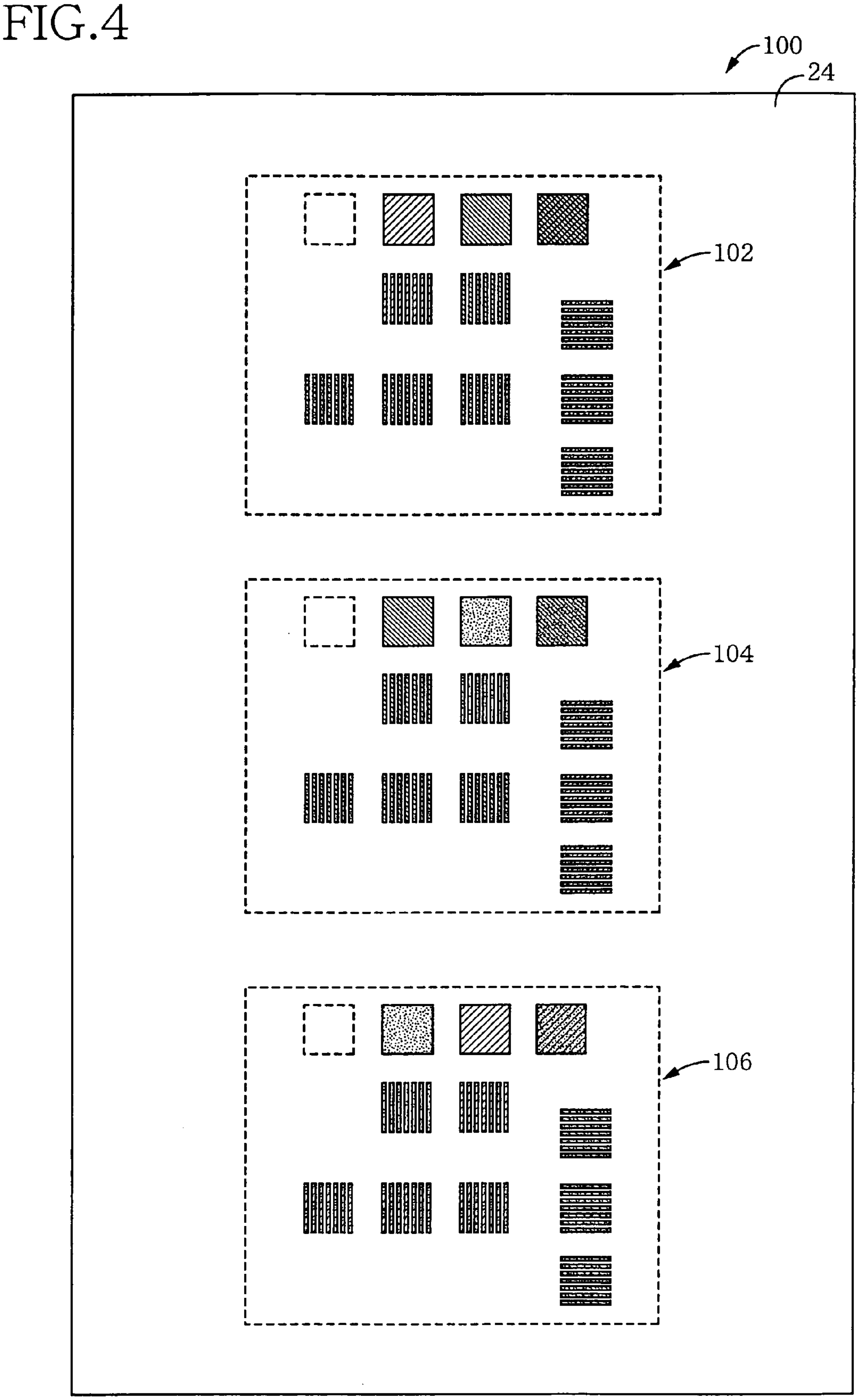
FIG. 4 is a schematic view showing a test sheet (image-formation article) used for detecting color deviation in the apparatus of FIG. 1.

FIG. 4 shows a test sheet which is an image-formation article which is used for detecting the color deviation in the present printer 10. As schematically shown in FIG. 4, the test sheet is constituted by a sheet 24 as a base object that is an image-formation medium, on which are formed a plurality of detecting images having a generally square shape of the same dimension. The test sheet indicated at 100 includes three detecting regions, i.e., a cyan-magenta detecting region 102, a magenta-yellow detecting region 104, and a yellow-cyan detecting region 106, as viewed from the top of FIG. 4. The detecting images in each detecting region are printed using at least one of the two colors which are indicated in the name of the detecting region. The three detecting regions 102, 104, 106 are identical to one another except for the color.

Figure 5:
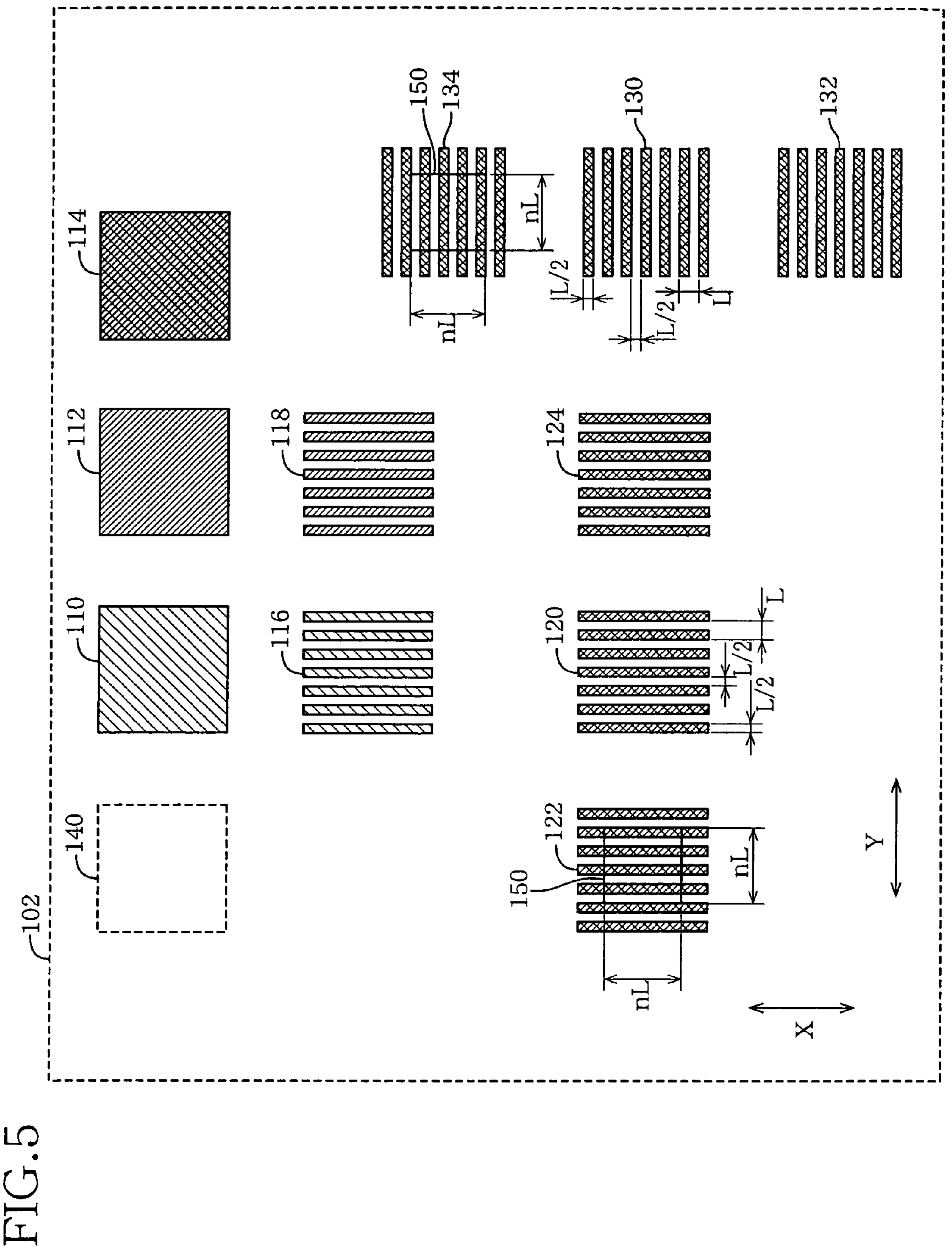
FIG. 5 is an enlarged schematic view showing one of three detecting regions of the test sheet of FIG. 4.

The following explanation is made with respect to the cyan-magenta detecting region 102 as a representative example. As shown in FIG. 5, in the cyan-magenta detecting region 102, there are printed five basic images 110-118 and six pattern-superposed images 120-134 which are classified into two groups. Each of the basic images 110-118 is a reference image in detecting the color deviation and a color-deviation-detecting image from which is obtained basic color information that is a basis for detecting the color deviation. The basic image 110 is a monocolor basic image (first-color basic image) printed only by the cyan ink, and is an image an entirety of which is colored, in detail, an entirety of which is uniformly printed. (Hereinafter, this image may be referred to as "an image having a solidly-colored pattern" or "a solid image".) The basic image 112 is a monocolor basic image (second-color basic image) printed only by the magenta ink, and is a solid image, like the basic image 110. The basic image 114 is a basic image in which the solid image of the cyan and the solid image of the magenta are superposed on each other, namely, a superposed-color basic image. The basic images 116, 118 are pattern basic images each having patterns which are the same as patterns of pattern images that constitute pattern-superposed images 120-134 explained below. The basic image 116 is the first-color basic image printed only by the cyan ink while the basic image 118 is the second-color basic image printed only by the magenta ink.

From each of the pattern-superposed images 120-134, there is obtained principal color information for detecting the color deviation. In each of the pattern-superposed images 120-134, a pattern image of the cyan having a predetermined pattern and a pattern image of the magenta having the same pattern as the predetermined pattern are superposed on each other. The predetermined pattern is constituted by a plurality of lines which are arranged so as to be spaced apart form one another and which extend in parallel with one another. The plurality of lines have the same width dimension (L/2), and are arranged at a predetermined pitch "L" with a predetermined spacing distance (L/2) which is equal to the width dimension. Where a rate of area of colored portions in each pattern image is defined as a colored-area rate K, a colored-area rate Kc of the pattern image of the cyan and a colored-area rate Km of the pattern image of the magenta are both ½.

The pattern-superposed images 120-134 are classified into the two groups. The pattern-superposed images 120-124 which belong to one of the two groups are printed such that the lines are regularly arranged in "Y"-direction shown in FIG. 5. The pattern-superposed images 130-134 which belong to the other group correspond to images which are printed such that the images 120-124 belonging to the above-indicated one group are rotated clockwise by 90°, so that the lines are regularly arranged in "X"-direction shown in FIG. 5. In other words, in each of the pattern-superposed images 130-134, the orientation of the patterns of the two pattern images is changed. The pattern-superposed images 120, 130 located at a middle portion in each group are printed at a printing position which is determined such that the pattern image of the cyan and the pattern image of the magenta are accurately superposed on each other, theoretically, in other words, on the assumption that no positional deviation occurs between the two pattern images. (The positional deviation may occur at the actual printing position.) The pattern-superposed image 122 is printed at a printing position which is determined such that the pattern image of the cyan and the pattern image of the magenta theoretically deviate from each other in the Y-direction by a predetermined amount. The pattern-superposed image 124 is printed at a printing position which is determined such that the two pattern images theoretically deviate relative to each other in a direction opposite to the direction of deviation in the pattern-superposed image 122 by the same predetermined amount. Similarly, the pattern-superposed image 132 is printed at a printing position which is determined such that the two pattern images theoretically deviate relative to each other in the X-direction by a predetermined amount while the pattern-superposed image 134 is printed at a printing position which is determined such that the two pattern image theoretically deviate from each other in a direction opposite to the direction of deviation in the pattern-superposed image 132 by the same predetermined amount.

In the cyan-magenta detecting region 102, a part of a non-colored portion which is not colored by any of the two colors is provided as a region 140 from which color information of the sheet 24 is obtained. (Hereinafter, this region 140 may be referred to as "a predetermined non-colored region 140".) The predetermined non-colored region 140 may be considered as "non-colored basic image".

The magenta-yellow detecting region 104 corresponds to the cyan-magenta detecting region 102 except that the portions printed by the cyan ink and the portions printed by the magenta ink in the region 102 are printed by the magenta ink and the yellow ink, respectively, in the region 104. Similarly, the yellow-cyan detecting region 106 corresponds to the cyan-magenta detecting region 102 except that the portions printed by the cyan ink and the portions printed by the magenta ink in the region 102 are printed by the yellow ink and the cyan ink, respectively, in the region 106. For simplification of the following explanation, in any of the three detecting regions 102-106, images printed by the same color of ink are printed with the same color and the same pattern, and there exist no errors among the three detecting regions 102-106. As the reference numerals indicating the basic images and the pattern-superposed images, there are employed the reference numerals used in the cyan-magenta detecting region 102 (i.e., the basic images 110-118 and the pattern-superposed images 120-134), unless otherwise specified.

For the basic images and the pattern-superposed images in the three detecting regions 102-106, there is obtained color information, in detail, color values. A predetermined color-measuring region 150 from which the color value of each image is obtained is provided at a central portion of each image. Briefly speaking, the color value of the color-measuring region 150 as a whole is obtained by averaging measured color values of multiplicity of color-value-measuring points which are provided within the color-measuring region 150 so as to be spaced apart from each other with an infinitesimal distance. The color-measuring region 150 has a square shape and a dimension corresponding to "n" times the pitch L, i.e., nL, in the pattern image, wherein "n" is natural number. According to this arrangement, the same constant color value is obtained at any portions in each of the pattern basic images 116, 118 and the pattern-superposed images 120-134. Namely, the color value as a whole in the color-measuring region (average color value) is constant irrespective of locations of the color-measuring region in each image. This also applies to a case where the pattern images of each pattern-superposed image deviate from the determined printing position. For simplifying the explanation, the positional deviation between the two images provided by respectively different two colors is determined to fall within a half pitch (L/2) at most.

<5. Technique of Detecting Color Deviation>

There will be next explained detection of color deviation based on the pattern-superposed images 120-134 (hereinafter, in this section, where it is not necessary to distinguish the individual pattern-superposed images, the reference numerals are omitted.), in detail, detection of a relative positional deviation between two pattern images which constitute each pattern-superposed image. The explanation is made with respect to the cyan-magenta detecting region 102 as a representative example.

Figures 6A, 6B, 6C:
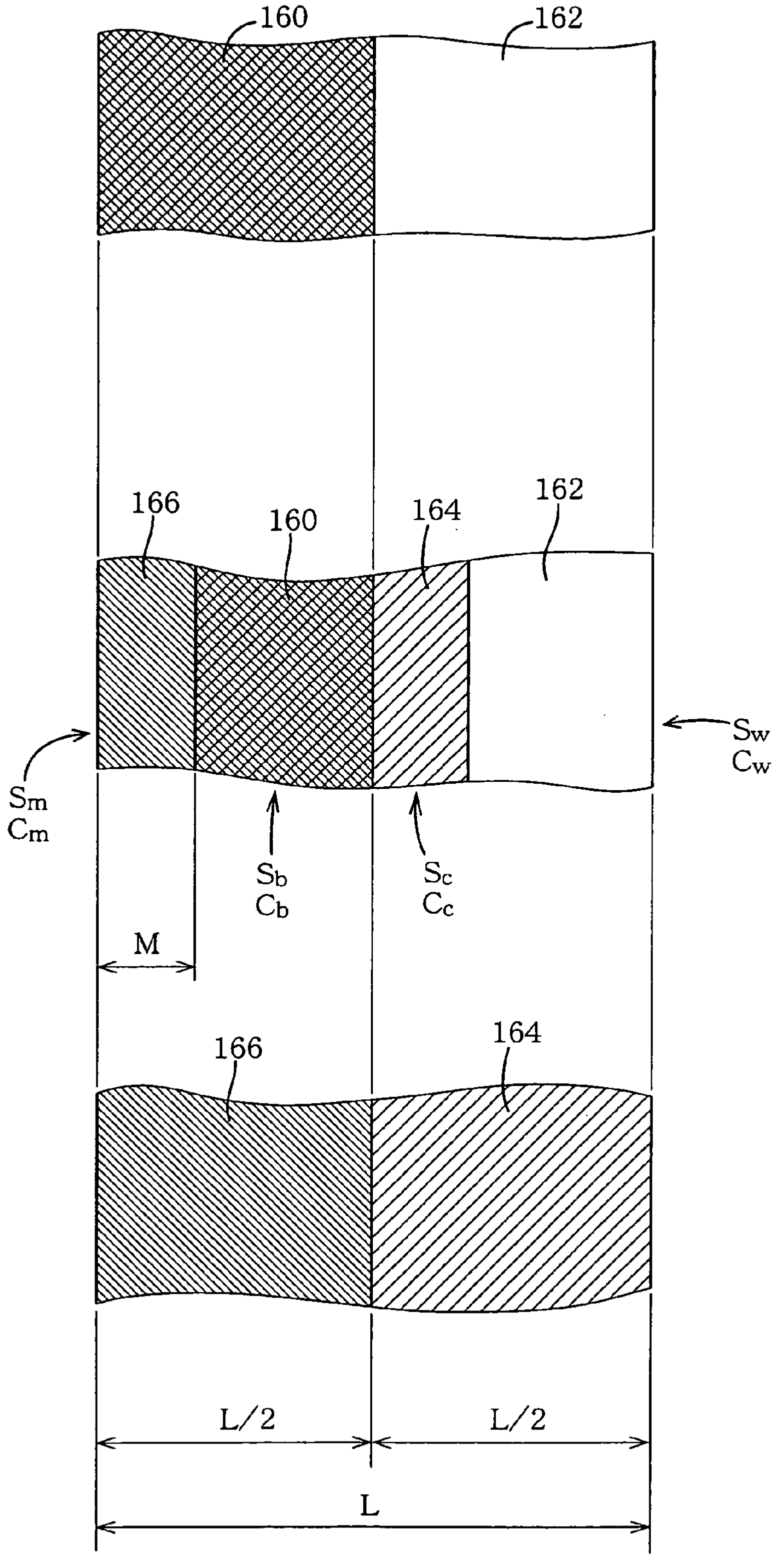
FIGS. 6A-6C are enlarged schematic views each showing a pattern-superposed image in the test sheet of FIG. 4.

Suppose that the two pattern images which provide the pattern-superposed image, i.e., the pattern image of the cyan and the pattern image of the magenta, are printed as determined. Where there exist no positional deviation, the pattern-superposed image is as shown in FIG. 6A which schematically indicates a part of the image in enlargement. In this case, the pattern-superposed image consists of two constituent parts, i.e., a superposed-color part 160 in which the cyan color and the magenta color are superposed and a medium-color part 162 which is not colored by any of the two colors and which has a color of the sheet 24 as the base object that is the image-formation medium. The superposed-color part 160 has a width (L/2) equal to the width of each of the plurality of lines in each pattern image, and the medium-color part 162 also has a width (L/2) equal to the width of each line. Where the two pattern images deviate from each other in a direction in which the lines are arranged, by a half pitch (L/2), the pattern-superposed image consists of two constituent parts, as shown in FIG. 6C, i.e., a cyan-color part 164 (as the first-color part) which is colored by only the cyan color and a magenta-color part 166 (as the second-color part) which is colored by only the magenta color. In this case, the width of the cyan-color part 164 is equal to the width of each line (L/2), and the width of the magenta-color part 166 is also equal to the width of each line (L/2). In an intermediate state between the state shown in FIG. 6A and the state shown in FIG. 6C, the pattern-superposed image consists of four constituent pats, as shown in FIG. 6B, i.e., the superposed-color part 160, the cyan-color part 164, the magenta-color part 166, and the medium-color part 162.

Where the above-described three states shown in FIGS. 6A-6C are generalized, there exists the following relationship between a relative positional deviation amount M which is an amount of the relative positional deviation between the two pattern images and a constituent-part area ratio of the four constituent parts 160-166 (i.e., a rate of the area of each constituent part with respect to the entire area of the pattern-superposed image):

area rate of the superposed-color part: $S_b=(1/2)-(M/L)$ area rate of the cyan-color part: $S_c=M/L$ area rate of the magenta-color part: $S_m=M/L$ area rate of the medium-color part: $S_w=1-S_b-S_c-S_m$ The above-indicated relationship may be referred to as "deviation-amount/area-ratio relationship". Where tristimulus values (X, Y, Z) as a color value of each constituent part are respectively represented as $(X_b, Y_b, Z_b)$, $(X_c, Y_c, Z_c)$, $(X_m, Y_m, Z_m)$, and $(X_w, Y_w, Z_w)$, there exists the following relationship between the tristimulus values and the area rate of each constituent part, and tristimulus values $(X_{mix}, Y_{mix}, Z_{mix})$ as the color value of the pattern-superposed image as a whole:

$$X_{mix}=X_b\cdot S_b+X_c\cdot S_c+X_m\cdot S_m+X_w\cdot S_w$$

$$Y_{mix}=Y_b\cdot S_b+Y_c\cdot S_c+Y_m\cdot S_m+Y_w\cdot S_w$$

$$Z_{mix}=Z_b\cdot S_b+Z_c\cdot S_c+Z_m\cdot S_m+Z_w\cdot S_w$$

The above-indicated relationship may be referred to as "area-ratio/color relationship".

Since the above-described three equations are present with respect to the area-ratio/color relationship, arithmetic operation is not likely to be univocal in some case. In view of this, it may be possible to employ any of the tristimulus values or an average value thereof, for instance, as a color value C which is a single color value employed in detecting the color deviation. Where the color value C is used, the above-indicated area-ratio/color relationship is represented as follows:

$$C_{mix}=C_b\cdot S_b+C_c\cdot S_c+C_m\cdot S_m+C_w\cdot S_w$$

It is arbitrarily determined depending upon situations what kind of color value is employed as the color value C. For example, where one of the tristimulus values is outstanding in obtaining the area-ratio/color relationship, the above-indicated one of the tristimulus values can be employed. In the technique described above, it may be possible to determine the area-ratio/color relationship using color values of other various calorimetric systems or color difference explained above, in place of the tristimulus values.

Figure 7:
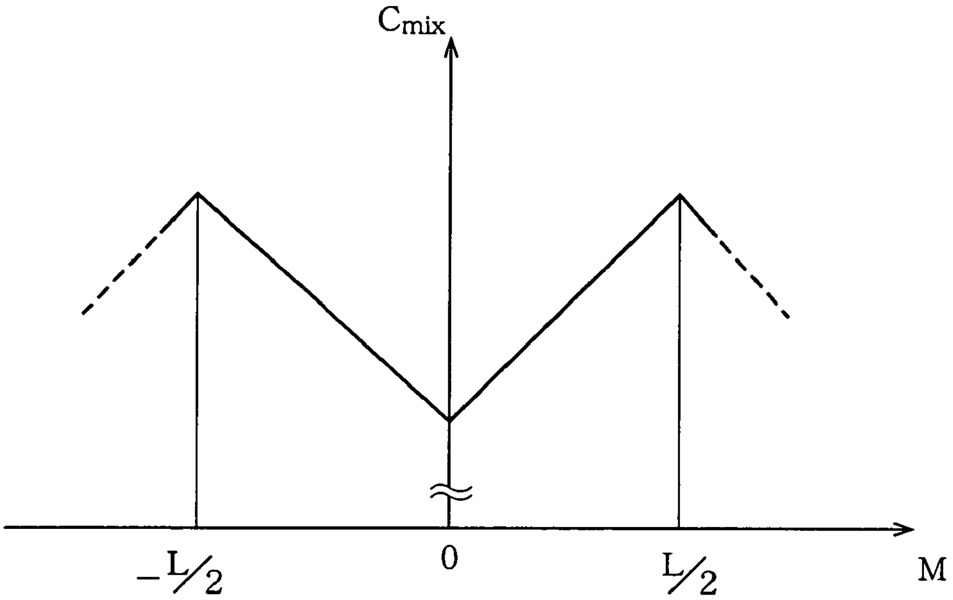
FIG. 7 is a graph schematically showing relationship between a color value of the pattern-superposed image and a relative positional deviation amount M between two pattern images of the pattern-superposed image.

The relationship between the color value $C_{mix}$ of the pattern-superposed image and the relative positional deviation amount M between the two pattern images is schematically indicated in a graph as shown in FIG. 7, for instance. The color value $C_{mix}$ has a peak in a state in which the relative positional deviation amount M is zero, namely, in a state in which there exist no relative positional deviation between the two pattern images, and has another peak opposite to the above-indicated peak in a state in which the two pattern images deviate from each other by an amount corresponding to a half pitch (L/2). As is understood from the theory explained above, where the color values $C_b$, $C_c$, $C_m$, $C_w$ of the respective four constituent parts 160-166 are already known, the absolute value of the positional deviation amount M of the two pattern images in the pattern-superposed image can be obtained by calculation, by obtaining the color value $C_{mix}$ by measurement. It is noted that, since the unit of the color value C is an arbitrary unit (a.u.), the relative positional deviation amount M is expressed in the graph of FIG. 7 such that the amount M is a minimum value in the state in which there exist no relative positional deviation and is a maximum value in the state in which the two pattern images deviate from each other by the amount corresponding to a half pitch. Depending upon the color value C, the amount M may be a maximum value in the state in which there exist no relative positional deviation and may be a minimum value in the state in which the two pattern images deviate from each other by the amount corresponding to a half pitch.

Figure 8A:
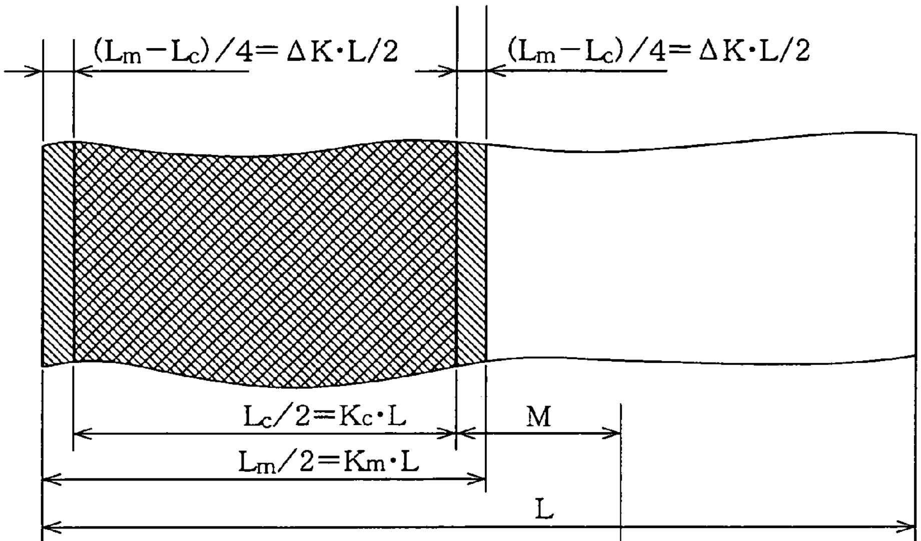
FIGS. 8A and 8B are schematic views each showing a state of constituent parts of the pattern-superposed image where the printed two pattern images are different from each other.
Figure 8B:
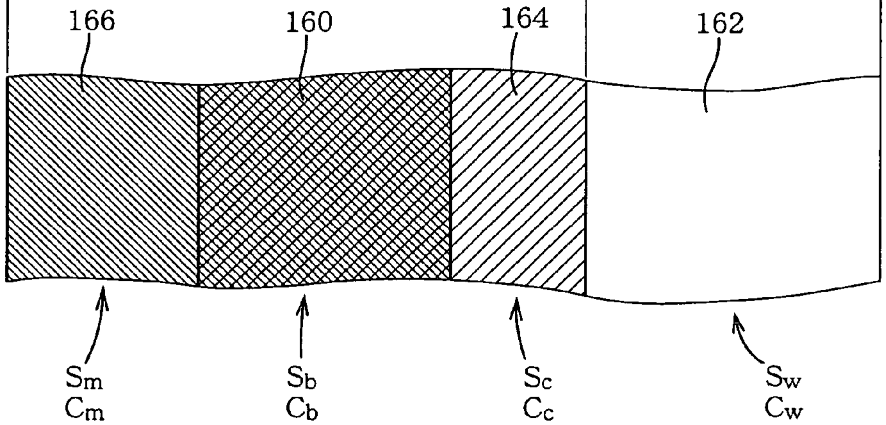

The color values $C_b$, $C_c$, $C_m$, $C_w$ of the respective four constituent parts 160-166 change depending upon the apparatus conditions such as the amounts of ejection of the respective inks, variation in the color of each ink to be used, etc. Accordingly, the above-indicated area-ratio/color relationship also changes. Where the color values $C_b$, $C_c$, $C_m$, $C_w$ are fixed at respective standard values, the relative positional deviation amount M calculated based on the above-indicated relationship includes an error which arises from the change in the area-ratio/color relationship. Thus, the detection accuracy is not so high. In the present embodiment, there are employed, as the color values $C_b$, $C_c$, $C_m$, $C_w$, actually measured values which are actually measured every time when the color deviation detection is to be carried out, instead of fixing the color values $C_b$, $C_c$, $C_m$, $C_w$. In the actual measurement of the color values $C_b$, $C_c$, $C_m$, $C_w$, the basic images (the solid basic images) 110-114 and the predetermined non-colored region 140 are utilized. In the present embodiment, the color values $C_b$, $C_c$, $C_m$, $C_w$ are obtained by the actual measurement and the actually measured values are employed in detecting the color deviation, so as to permit highly accurate color deviation detection in which are considered the detection-accuracy-inhibition factors such as the change in the apparatus conditions.

Where the amount of ejection of each ink changes, the pattern of each of the actually printed pattern images also changes. That is, the dimension of each of the colored portions in each pattern image increases or decreases, namely, the width of each line in each pattern image changes and the width of each of the non-colored portions in each pattern image accordingly changes, so that the above-indicated deviation-amount/area-ratio relationship also changes. As schematically indicated in FIG. 8A, for instance, where the two patterns are printed such that the width of the line of the cyan color is $L_c/2$ and the width of the line of the magenta color is $L_m/2$, a colored-area rate $K_c$ which is a rate of area of the cyan-color parts 164 in the pattern image of the cyan and a colored-area rate $K_m$ which is a rate of area of the magenta-color parts 166 in the pattern image of the magenta are represented by the following equations:

$$K_c=L_c/(2L)$$

$$K_m=L_m/(2L)$$

Where the pattern-superposed image in which the two pattern images are printed with respective patterns described above suffers from color deviation by a deviation amount M, as schematically shown in FIG. 8B, the above-indicated deviation-amount/area-ratio relationship is not established. In this instance, where a difference $\Delta K$ between the colored-area rate $K_c$ and the colored-area rate $K_m$ is defined as $\Delta K=K_m-K_c$, the following relationship is established:

$$S_b=(K_c+K_m)/2-(M/L)$$

$$S_c=(M/L)-(\Delta K/2)$$

$$S_m=(M/L)-(\Delta K/2)$$

$$S_w=1-S_b-S_c-S_m$$

In the present embodiment, the relative positional deviation amount M between the two pattern images is calculated on the basis of the four equations indicated just above and the above-indicated equation in which the color value C is used and which represents the area-ratio/color relationship.

The colored-area rate explained above is also one kind of the color information. In the present embodiment, the colored-area rate K of each of the actual two pattern images is obtained every time when the color deviation detection is to be carried out, and the detection is carried out on the basis of the deviation-amount/area-ratio relationship in which the obtained colored-area rate K is used as a parameter. Therefore, this arrangement permits highly accurate color deviation detection even when the apparatus conditions such as the ink ejection amounts change. Namely, by taking into account the influence of the detection-accuracy inhibition factors such as the change in the apparatus conditions, the present arrangement assures highly accurate color deviation detection.

The colored-area rates $K_c$, $K_m$ are obtained from respective color values $C_{cp}$, $C_{mp}$ which are obtained by measuring color values of the basic images 116, 118 as the pattern basic images. There establishes relationship between those color values $C_{cp}$, $C_{mp}$ and the above-described color values $C_c$, $C_m$, $C_w$ which are obtained by actually measuring the color values of the solid basic images 110, 112 and the predetermined non-colored region 140:

$$C_{cp}=K_c\cdot C_c+(1-K_c)\cdot C_w$$

$$C_{mp}=K_m\cdot C_m+(1-K_m)\cdot C_w$$

Accordingly, the colored-area rates $K_c$, $K_m$ are calculated on the basis of the relationship indicated above.

It is noted that the above-described four equations representing the deviation-amount/area-ratio relationship do not hold where $S_c$ or $S_m$ is a negative value. Namely, where $M/L < |\Delta K/2|$, there exists a deviation-amount-undetectable range in which the detection of the color deviation is impossible. More specifically explained, where the width of each line in the pattern image of the cyan is $L_c/2$ and the width of each line in the pattern image of the magenta is $L_m/2$, it is impossible to detect a positional deviation amount smaller than $|L_m-L_c|/4$. As shown in FIGS. 8A, 8B, in a case where $K_c<K_m$, within the deviation-amount-undetectable range, the area rate of each constituent part is as follows:

$$S_b=K_c$$

$$S_c=0$$

$$S_m=K_m-K_c$$

$$S_w=1-S_b-S_c-S_m$$

In a case where $K_c>K_m$, within the deviation-amount-undetectable range, the area rate of each constituent part is as follows:

$$S_b=K_m$$

$$S_c=K_c-K_m$$

$$S_m=0$$

$$S_w=1-S_b-S_c-S_m$$

As is understood from the equations described above, the area rate of each constituent part does not depend on the deviation amount M. Accordingly, by grasping the colored-area rates $K_c$, $K_m$, it is possible to recognize limitation of the detection accuracy. Thus, the color deviation detection according to the present embodiment assures high reliability since the limitation of the detection accuracy can be recognized. As will be explained, where it is judged that the detection accuracy is insufficient, the color deviation detection is arranged to be again performed in a state in which the pattern images with respective proper colored-area rates $K_c$, $K_m$ can be printed after changing the patterns, i.e., the width of each line and the space between the adjacent lines in each pattern.

Figure 9A:
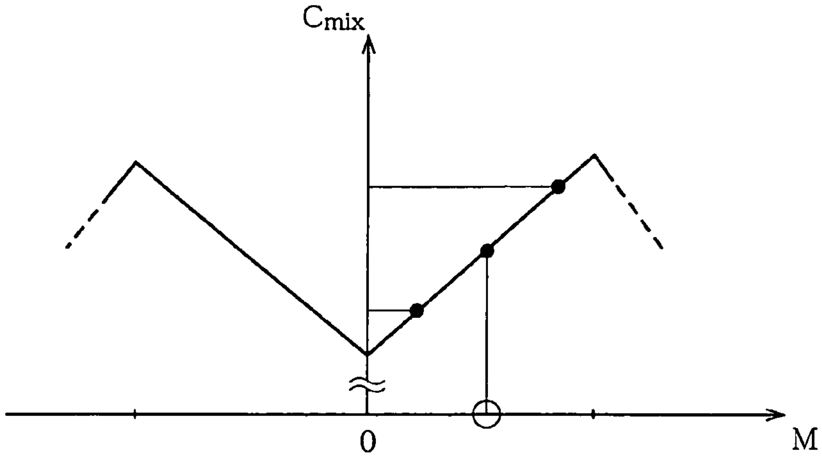
FIGS. 9A-9C are graphs each indicating a technique for obtaining a direction of the relative positional deviation between the two pattern images.
Figure 9B:
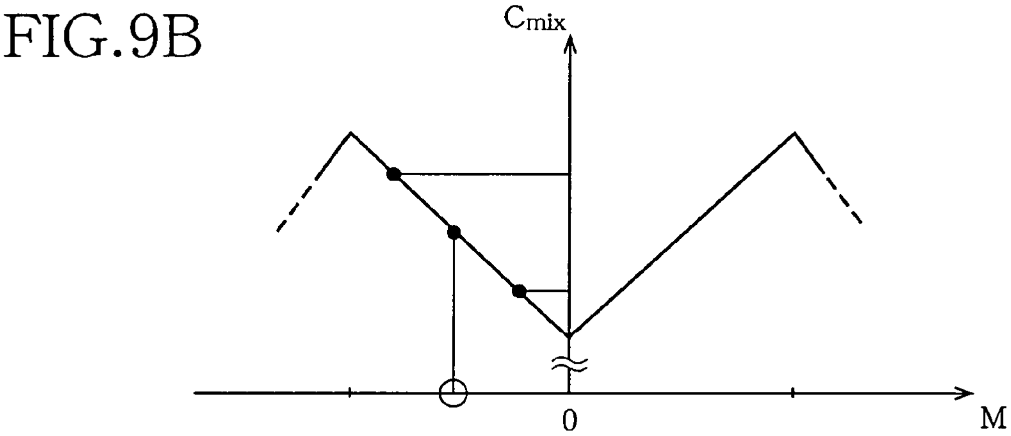
Figure 9C:
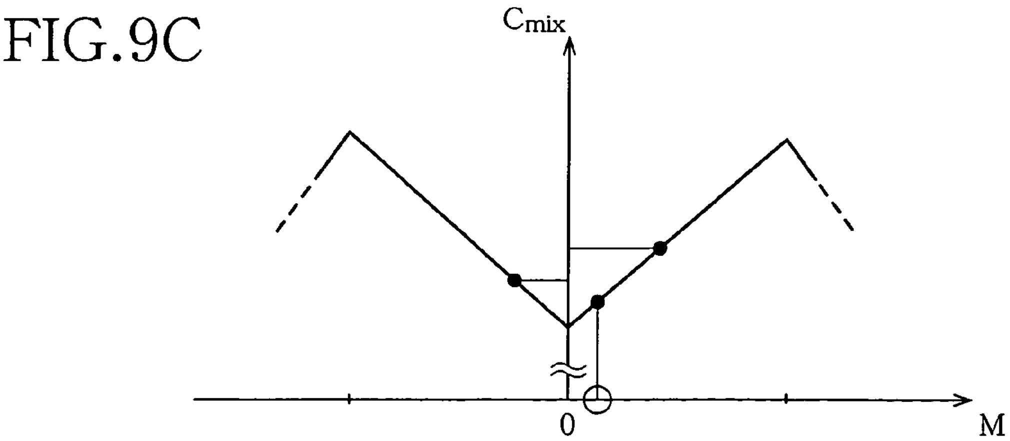

As explained above, the three pattern-superposed images belonging to each group are printed on the test sheet 100. In each group, the two pattern-superposed images 122, 124; 132, 134 located on the opposite sides of the pattern-superposed image 120; 130 located in the middle are arranged such that the two pattern images in the images 122, 132 deviate relative to each other in one direction (the Y-direction or the X-direction in FIG. 5) by the predetermined amount while the two pattern images in the images 124, 134 deviate relative to each other in another direction opposite to that one direction by the same predetermined amount. In this respect, the direction of positional deviation is detected based on relative relation of the color values $C_{mix}$ of the pattern-superposed images 122, 124; 132, 134 located on the opposite sides of the middle images 120; 130 while the absolute value of the positional deviation amount M is obtained based on the color information of the middle pattern-superposed images 120; 130 as described above. More specifically explained, in a case as shown in the graph of FIG. 9A, it is judged that the pattern-superposed image suffers from the positional deviation in a positive direction and the positional deviation amount M is a positive value. On the other hand, in a case as shown in the graph of FIG. 9B, it is judged that the pattern-superposed image suffers from the positional deviation in a negative direction and the positional deviation amount M is a negative value. In a case as shown in the graph of FIG. 9C, it is judged that the pattern-superposed image suffers from the positional deviation in the positive direction. The determination as to which one of the opposite two directions in which the pattern image of the cyan color and the pattern image of the magenta color deviate relative to each other is the positive direction is made depending upon in which direction the pattern-superposed images 122, 124; 132, 134 located on the opposite sides of the middle pattern-superposed image 120; 130 deviate relative to the middle image 120; 130.

On the test sheet 100, the two groups of the pattern-superposed images are printed in the X-direction and the Y-direction, respectively, as shown in FIG. 5. By carrying out the detection of the color deviation for each group, the direction and amount of the deviation can be obtained in each of the X-direction and Y-direction. In other words, it is possible to detect the relative positional deviation between the monocolor images provided by the respective two colors. Further, the three detecting regions 102-106 are provided on the test sheet 100. By carrying out the detection of the color deviation for at least two of the three detecting regions, the relative positional deviation among the monocolor images provided by the respective three colors.

<6. Color-Deviation-Detection-Relating Operation>

Figure 10:
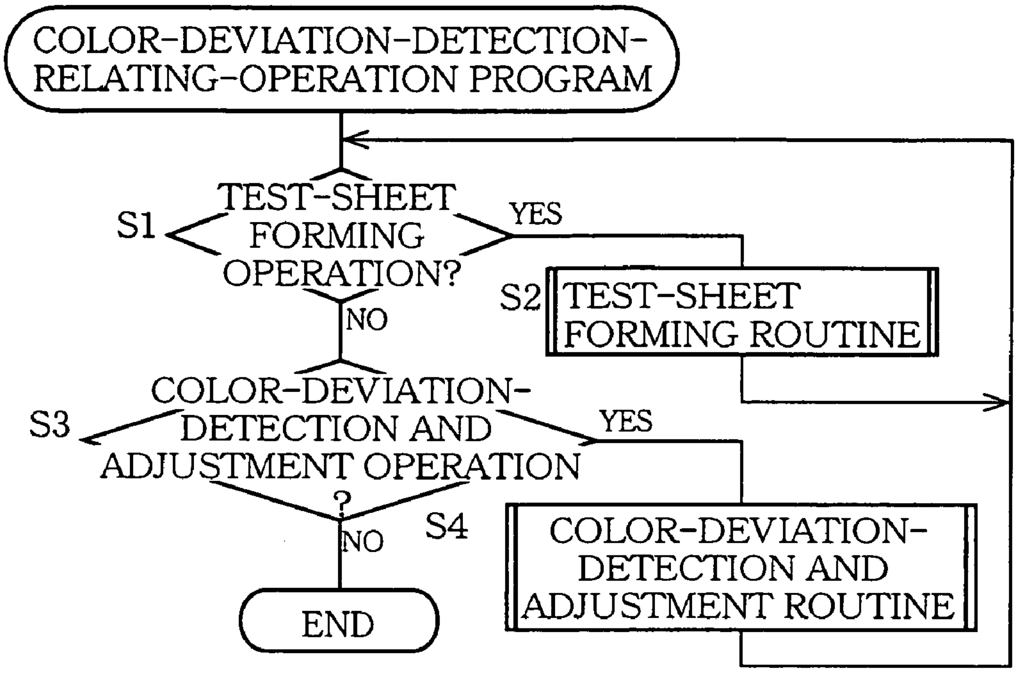
FIG. 10 is a flow chart showing a color-deviation-detection-relating-operation program incorporated in a control program of the apparatus of FIG. 1.

The control of the printer 10 is carried out such that the control device 16 executes a printer-control program which is a color-image-forming-apparatus control program. The color-deviation-detection-relating operation is carried out such that a color-deviation-detection-relating-operation program (indicated by a flow chart of FIG. 10) included in the printer-control program is executed. This color-deviation-detection-relating-operation program is a program stored in the ROM, and read out and executed by an input operation to the operating panel 18 by the operator.

Figure 11:
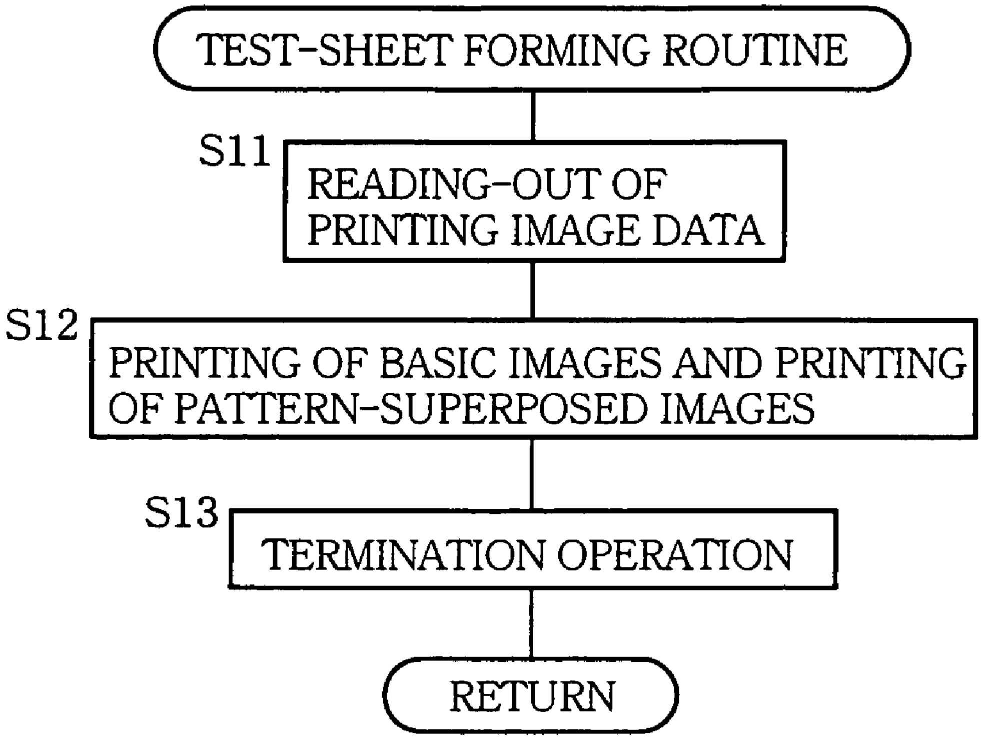
FIG. 11 is a flow chart showing a test-sheet forming routine which partially constitutes the color-deviation-detection-relating-operation program of FIG. 10.
Figure 12:
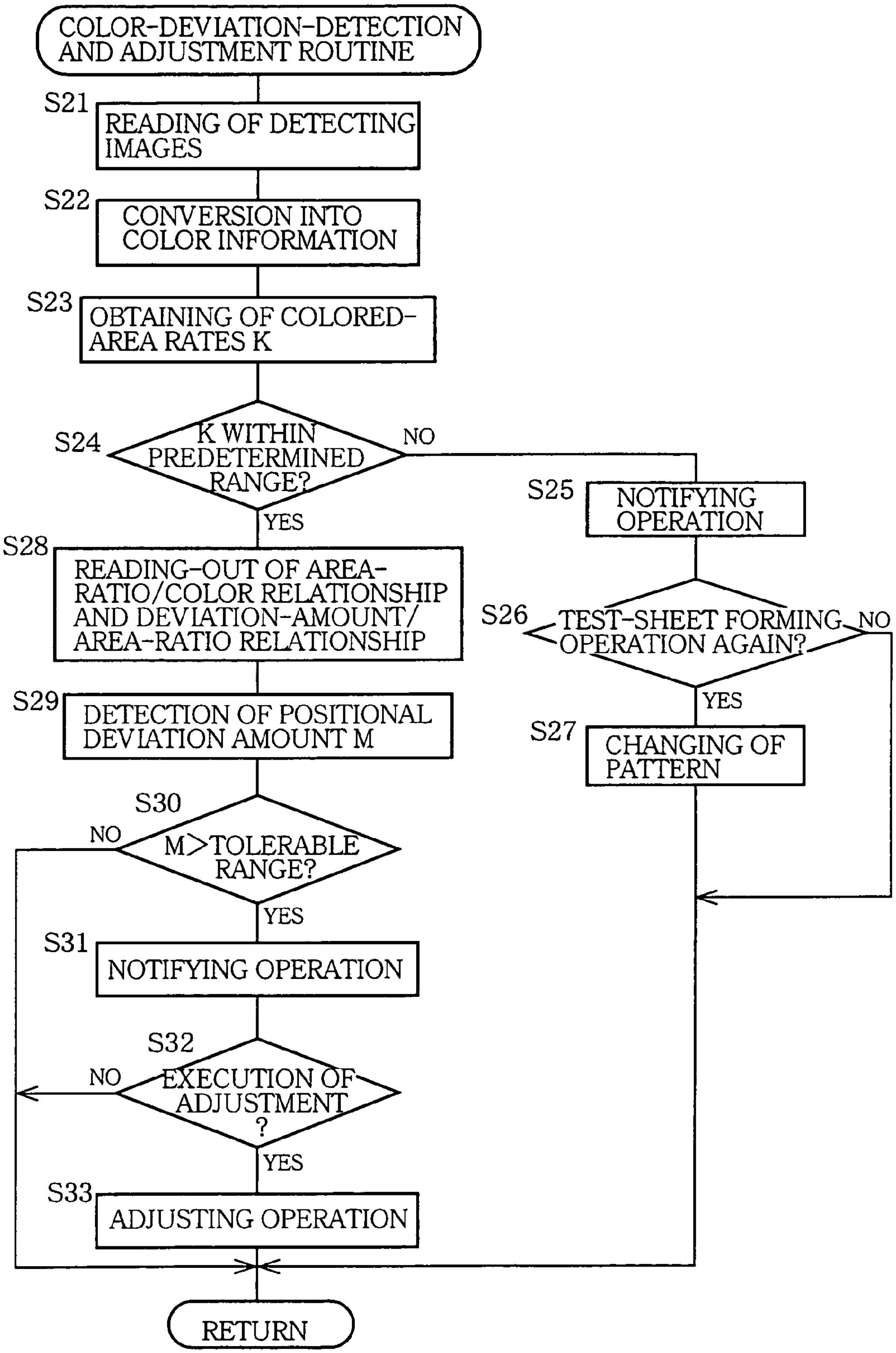
FIG. 12 is a flow chart showing a color-deviation-detection and adjustment routine which partially constitutes the color-deviation-detection-relating-operation program of FIG. 10.

When the color-deviation-detection-relating-operation program is started, the display of the operating panel 18 becomes a stand-by screen for selection of operation to be carried out, and next input operation by the operator is awaited. Upon input operation of the operator, it is judged in Step S1 whether the input operation instructs test-sheet forming operation for forming the test sheet 100 explained above. (Hereinafter, "Step" is omitted, if appropriate.) Where the input operation instructs the test-sheet forming operation, a test-sheet forming routine shown in a flow chart of FIG. 11 is implemented. Where the input operation does not instruct the test-sheet forming operation, it is judged in S3 whether the input operation instructs color-deviation-detection and adjustment operation. Where the input operation instructs the color-deviation-detection and adjustment operation, a color-deviation-detection and adjustment routine shown in a flow chart of FIG. 12 is implemented. Where the selection of the above-described two operation is not made within a predetermined time period, the execution of the color-deviation-detection-relating-operation program is terminated. Hereinafter, the two operation described above will be explained.

i) Test-Sheet Forming Operation

In the test-sheet forming routine of S2, S11 is initially implemented to read out printing image data of the basic images and the pattern-superposed images which are the color-deviation-detecting images to be printed on the sheet 24. The printing image data are stored in the information storage portion 90 and include various data such as data relating to the pattern of the pattern images which constitute each pattern-superposed image, data relating to the printing positions of the basic images and the pattern-superposed images on the sheet 24, etc.

After the sheet 24 has been set on the printing device 12, S12 is implemented as a result of the input operation by the operator to the operating panel 18 as a trigger. In S12, the printing device 12 is controlled such that the above-described basic images and pattern-superposed images are simultaneously printed. The operation in S12 is executed as a result of transmission of the printing image data from the image-forming control portion 60 to the printing-device control portion 56 and generation of execution command.

S11 and S12 are operation in which the basic-image forming step and the pattern-superposed-image forming step are joined together. Described in detail, the execution of the basic-image forming step is performed by the basic-image-forming control portion 62 and the execution of the pattern-superposed-image forming step is performed by the pattern-superposed-image-forming control portion 64. The basic-image forming and the pattern-superposed-image forming are carried out by the operation in respective steps.

After the detecting images have been printed and the test sheet 100 has been formed, termination operation in S13 is implemented. In this termination operation, there is performed operation to indicate a message indicative of completion of the test sheet 100 on the display of the operating panel 18, for instance. Thereafter, the operation returns back to the top of the program.

ii) Color-Deviation-Detection and Adjustment Routine

In the color-deviation-detection and adjustment routine of S4, S21 is initially implemented to execute reading of the detecting images by the scanning device 14 as a result of the input operation by the operator to the operating panel 18 as a trigger, which input operation is carried out after the test sheet 100 has been set on the scanning device 14. More specifically described, the color-information-obtaining control portion 66 sends a command to the image-data-reading control portion 72. The image-data-reading control portion 72 reads out, from the information storage portion 90, the position of each detecting image on the test sheet 100, data such as the above-described predetermined color-measuring region, etc., and sends a command to start reading operation, together with the read information, to the scanning-device control portion 54. The scanning device 14 reads the image data of the detecting images and outputs the read image data of the detecting images (including image data of the predetermined non-colored region 140) to the image-data processing portion 74. In S21, the basic-image-data reading step and the pattern-superposed-image-data reading step are joined together.

Subsequently in S22, the read image data of the detecting images are converted into color information of the detecting images. This conversion is performed by the image-data processing portion 74. More specifically described, the image data read by the scanning device 14 is set of RGB luminance signals. In S22, the RGB luminance signals are converted into the tristimulus values of each detecting image while referring to the map data stored in the information storage portion 90. The converted data representative of color values are sent to the color-information-obtaining control portion 66. In the following S23, on the basis of the color information of the pattern basic images explained above, the colored-area rates K of the pattern basic images, i.e., the colored-area rates K of the two pattern images which constitute each pattern-superposed image are calculated according to the technique explained above referring to the equations.

Where the operation in S21-S23 are put together, the operation in S21-S23 may be considered as a step of obtaining the color information of each detecting image, and it may be considered as a step in which the basic-color-information-obtaining step and superposed-pattern-color-information obtaining step are joined together. Since the operation in S21-S23 is performed under control of the color-information-obtaining control portion 66, the operation may be referred to as operation performed by the color-information-obtaining control portion 66, in detail, operation performed by the basic-color-information-obtaining control portion 68 and the superposed-pattern-color-information-obtaining control portion 70. Further, the basic-color-information obtaining and the superposed-pattern-color-information obtaining are carried out by the operation in S21-23. In particular, the operation in S23 function as the pattern-basic-image-color-information obtaining step, and the basic-color-information-obtaining control portion 68 includes, as a portion which performs that operation, a pattern-basic-image-color-information-obtaining control portion.

Subsequently, in S24, it is judged whether the colored-area rate K of each pattern basic image falls within a predetermined range. That is, in S24, it is judged whether the detection-amount-undetectable range explained above falls within a predetermined range. Where it is judged that the colored-area rate K is outside the predetermined range, notifying operation is performed in S25 to notify that the colored-area rate K is outside the predetermined range. This notifying operation is carried out through the display of the operating panel 18, and an instruction of the operator is awaited as to whether the test sheet is again formed.

Where the instruction of the operator is received, it is judged in S26 whether the instruction instructs forming the test sheet again. Where the instruction instructs forming the test sheet again, the pattern of the pattern basic image whose colored-area rate K is outside the predetermined range, i.e., the pattern of the pattern image, is changed in S27. More specifically described, the pattern data of the pattern image stored in the information storage portion 90 is changed such that the colored-area rate K falls within the predetermined range, and the changed pattern data is stored in the information storage portion 90. The routine ends with the operation in S27. That is, the operation relating to the detection of the positional deviation to be performed in S28 and the following steps is skipped. Where it is judged in S26 that the test sheet 100 is not formed again, the routine is terminated without implementing the pattern changing operation in S27. Where the test sheet 100 is again formed, the operation of the test-sheet-forming routine in S2 is selected on the initial stand-by screen in the color-deviation-detection-relating operation program. By execution of S2, a new test sheet 100 is formed based on the changed and stored pattern data.

The operation in S27 constitutes the pattern changing step. The control device 16 includes, as a portion which executes this step, the pattern-changing control portion 94 in the stored-information-changing control portion 92. The pattern changing is carried out by a series of the operation.

Where it is judged in S24 that the colored-area rate K of each pattern basic image falls within the predetermined range, S28 and the following steps are implemented, that is, a series of operation is performed for detecting the positional deviation of the pattern images based on the obtained color information of the detecting images. In S28, the arithmetic expression data which are indicative of the above-described area-ratio/color relationship and deviation-amount/area-ratio relationship and which are stored in the information storage portion 90 are read out. In the following S29, there are calculated the positional deviation amount M of the two pattern images which constitute each pattern-superposed image and the direction of the positional deviation of the two pattern images relative to each other, for the X-direction and the Y-direction. This calculation technique is already explained in detail, the explanation is omitted. It is noted that, in S29, the positional deviation amount M and the direction of the positional deviation are arranged to be detected for the two detecting regions. By summing up the results, the color deviation of the monocolor images printed by the respective three color inks is detected.

It is noted that S28 and S29 correspond to the positional-deviation detecting step for detecting a relative positional deviation between the two pattern images which constitute the pattern-superposed image. The control device 16 includes, as a portion which performs this step, the positional-deviation detecting portion 80. The detecting of the positional deviation is carried out by a series of the operation in S28 and S29. The results of the detection are indicated on the display of the operating panel 18.

Subsequently, in S30, it is judged whether the positional deviation amount M detected in S29 is outside the tolerable range in any two of the three colors. Where it is judged that the positional deviation amount M is outside the tolerable range, notification that the adjustment of the positional deviation is required is made to the operator through the display of the operating panel 18 in S31, and instructions by the operator is awaited. In the following S32, it is judged whether input operation for executing the adjustment is made. Where the adjustment is carried out, the adjusting operation in S33 is performed. The adjusting operation in S33 is performed by changing the offset values ($\Delta x$, $\Delta y$) of each monocolor image which are stored in the information storage portion 90. More specifically described, the offset values which are needed to be changed are changed to suitable values based on the positional deviation amount M and the direction of the positional deviation as the detection results. After the offset values have been changed, the color-deviation-detection and adjustment routine is terminated. Where it is judged in S32 that input operation for executing the adjustment is not made, S33 is skipped and the color-deviation-detection and adjustment routine is terminated. Where it is judged in S30 that the positional deviation amounts M of all of any two of the three colors fall within the predetermined range, the operation in S31 and the following steps is skipped and the routine is terminated.

The operation in S33 constitutes the relative-positional-relationship changing step of changing the relative positional relationship between the forming positions of the two monocolor images printed by the printing device 12. The control portion 16 includes, as a portion which executes the step, the relative-positional-relationship-changing control portion 96 in the stored-information-changing control portion 92. Further, the changing of the relative positional relationship is carried out by the operation.

<Modification>

The printer 10 described above obtains the color information of each detecting image by the scanning device 14 as the image-data reading device and the image-data processing portion 74. Accordingly, the scanning device 14 and the image-data processing portion 74 constitute the color measuring device. As explained above, the printer 10 may be equipped with the calorimeter 34 as an option. In this case, the printer 10 includes a color measuring device which is constituted principally by the colorimeter 34 and which does not require the image-data processing portion 74. The calorimeter 34 is preferably a spectral calorimeter. Where the calorimeter 34 is a spectral calorimeter, the tristimulus values can be directly obtained. In a case where the color information is obtained using the calorimeter 34, S21 and S22 of the above-described color-deviation-detection and adjustment routine may be arranged as follows: Information which navigates color measurement by the calorimeter 34 is indicated on the display of the operating panel 18. Based on the information, the color measuring operation by the operator is carried out, in order, for the plurality of the detecting images printed on the test sheet 100, and the colorimeter 34 is arranged to transmit the color information to the color-information-obtaining control portion 66 every time when the color information is obtained.

What is claimed is:

1. A method of detecting color deviation in a color image forming apparatus which forms a color image on an image-formation medium by superposing monocolor images each provided by each of plurality of colors, the method comprising:

obtaining basic color information including at least one of (A) color information of at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image which is formed by the color image forming apparatus and from which is obtained information that is a basis for detecting the color deviation, and (B) color information of the image-formation medium which is not colored by any of the two colors;

obtaining superposed-pattern color information which is color information of a pattern-superposed image formed by the color image forming apparatus such that two pattern images each provided by each of the two colors are superposed; and detecting a relative positional deviation between the two pattern images, on the basis of the basic color information and the superposed-pattern color information.

2. The method according to claim 1, wherein the obtaining superposed-pattern color information comprises obtaining, as the superposed-pattern color information, a color value of the pattern-superposed image, and the detecting a relative positional deviation comprises detecting, on the basis of the color value of the pattern-superposed image, a relative positional deviation amount which is an amount of the relative positional deviation between the two pattern images, according to (C) relationship between (c-1) the color value of the pattern-superposed image and (c-2) color values of four constituent parts each of which partially constitutes the pattern-superposed image, the four constituent parts consisting of a first-color part provided by only one of the two colors, a second-color part provided by only the other of the two colors, a superposed-color part provided by superposing the two colors, and a medium-color part in which any of the two colors are not present and which has a color of the image-formation medium, and a constituent-part-area-ratio index value indicative of an area ratio of the four constituent parts, and (D) relationship between (d-1) the constituent-part-area-ratio index value and (d-2) the relative positional deviation amount.

3. The method according to claim 2, wherein the obtaining basic color information comprises obtaining, as the basic color information, at least one of (E) a color value of at least one basic image an entirety of which is colored and which is formed as at least one of the first-color basic image, the second-color basic image, and the superposed-color basic image, and (F) a color value of the image-formation medium, and the detecting a relative positional deviation comprises: determining at least one of the color values of the four constituent parts on the basis of the at least one of (E) the color value of the at least one basic image and (F) the color value of the image-formation medium; and detecting the relative positional deviation amount on the basis of the determined at least one of the color values.

4. The method according to claim 2, wherein the obtaining basic color information comprises obtaining, as the basic color information, at least one colored-area-rate index value each indicative of an area rate of at least one colored portion of a pattern basic image which is formed as one of the first-color basic image and the second-color basic image and which is one of two images whose patterns are respectively the same as patterns of the respective two pattern images, and the detecting a relative positional deviation comprises: determining the constituent-part-area-ratio index value on the basis of the at least one colored-area-rate index value; and detecting the positional deviation amount on the basis of the determined constituent-part-area-ratio index value.

5. The method according to claim 1, wherein the two pattern images have respective patterns which are identical to each other.

6. The method according to claim 1, wherein the two pattern images have respective patterns each of which is constituted by a plurality of lines arranged so as to be spaced apart from one another, the plurality of lines extending in parallel with one another in a direction intersecting a detecting direction in which the relative positional deviation is detected.

7. The method according to claim 6, wherein the plurality of lines have the same width dimension and are arranged at a predetermined pitch with a predetermined spacing distance equal to the width dimension.

8. The method according to claim 1, wherein the two pattern images have respective patterns each of which is constituted such that color information of a region in the pattern-superposed image having a predetermined dimension and configuration is constant at any locations in the pattern-superposed image.

9. The method according to claim 1, further comprising forming at least one of the first-color basic image, the second-color basic image, and the superposed-color basic image on a base object which is the image-formation medium, using the color image forming apparatus.

10. The method according to claim 1, further comprising forming the pattern-superposed image on a base object which is the image-formation medium, using the color image forming apparatus.

11. A control device which controls a color image forming apparatus which forms a color image on an image-formation medium by superposing monocolor images each provided by each of plurality of colors, the control device comprising:

a basic-image-forming control portion which controls the color image forming apparatus to form at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image from which is obtained information that is a basis for detecting color deviation in the color image forming apparatus;

a pattern-superposed-image-forming control portion which controls the color image forming apparatus to form a pattern-superposed image in which two pattern images each provided by each of the two colors are superposed; and a positional deviation detecting portion which detects a relative positional deviation between the two pattern images on the basis of basic color information and superposed-pattern-color information, the basic color information including at least one of (G) color information of at least one of the first-color basic image, the second-color basic image and the superposed-color basic image, and (H) color information of the image-formation medium which is not colored by any of the two colors while the superposed-pattern color information being color information of the pattern-superposed image.

12. The control device according to claim 11, further comprising a relative-positional-relationship-changing control portion which changes a relative positional relationship between forming positions of two monocolor images each of which is provided by each of the two colors and which are formed by the color image forming apparatus, on the basis of information of a relative positional deviation between the two pattern images, which information is input to the relative-positional-relationship-changing control portion.

13. The control device according to claim 11, which controls the color image forming apparatus equipped with a color measuring device and which further comprises:

a basic-color-information-obtaining control portion which controls the color measuring device to obtain the basic color information and;

a superposed-pattern-color-information-obtaining control portion which controls the color measuring device to obtain the superposed-pattern color information; and wherein the positional-deviation detecting portion which detects the relative positional deviation between the two pattern images, on the basis of the basic color information and the superposed-pattern-color information which are obtained by the color measuring device.

14. The control device according to claim 11, further comprising a pattern-changing control portion which changes at least one of patterns of the respective two pattern images which are formed by the color image forming apparatus.

15. The control device according to claims 14, wherein the basic-image-forming control portion comprises a portion which controls the color image forming apparatus to form at least one pattern basic image each of which is formed as at least one of the first-color basic image and the second-color basic image and which is at least one of two images whose patterns are respectively the same as the patterns of the respective two pattern images, the control device controls the color image forming apparatus equipped with a color measuring device and further comprises a pattern-basic-image-color-information-obtaining control portion which controls the color measuring device to obtain color information of the at least one pattern basic image, and the pattern-changing control portion comprises a portion which changes the at least one of the patterns of the respective two pattern images, on the basis of the color information of the at least one pattern basic image which is input to that portion.

16. The control device according to claim 11, which controls the color image forming apparatus equipped with a color measuring device including: an image-data reading device which reads image data; and an image-data processing portion which performs operation for obtaining color information on the basis of the image data read by the image-data reading device.

17. A computer-readable recording medium that stores a computer program executed by a computer for controlling a color image forming apparatus which forms a color image on an image-formation medium by superposing monocolor images each provided by each of plurality of colors, the computer program comprising:

a basic-image forming step in which the color image forming apparatus forms at least one of a first-color basic image provided by one of two colors of the plurality of colors, a second-color basic image provided by the other of the two colors, and a superposed-color basic image formed by superposing monocolor images each provided by each of the two colors, each of the first-color basic image, the second-color basic image, and the superposed-color basic image being a basic image from which is obtained information that is a basis for detecting color deviation in the color image forming apparatus;

a pattern-superposed-image forming step in which the color image forming apparatus forms a pattern-superposed image in which two pattern images each provided by each of the two colors are superposed; and a relative positional deviation detecting step in which the color image forming apparatus detects a relative positional deviation between the two pattern images, on the basis of basic color information and superposed-pattern color information.

* * * * *